US007654896B2

(12) United States Patent
Baerlocher

(10) Patent No.: US 7,654,896 B2
(45) Date of Patent: *Feb. 2, 2010

(54) GAMING SYSTEM WHICH PROVIDES MULTIPLE PLAYERS MULTIPLE BONUS AWARDS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/830,030

(22) Filed: Jul. 30, 2007

(65) Prior Publication Data

US 2008/0020829 A1 Jan. 24, 2008

Related U.S. Application Data

(63) Continuation of application No. 11/219,949, filed on Sep. 6, 2005, now Pat. No. 7,500,913.

(51) Int. Cl.
*A63F 9/24* (2006.01)
*A63F 13/00* (2006.01)

(52) U.S. Cl. ............................ 463/16; 463/25; 463/26; 463/42

(58) Field of Classification Search ............ 463/16–22, 463/25–28, 40–42
See application file for complete search history.

(56) References Cited

U.S. PATENT DOCUMENTS

| | | | |
|---|---|---|---|
| 3,633,915 | A | 1/1972 | Lippert |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |
| 4,448,419 | A | 5/1984 | Telnaes |
| 4,494,197 | A | 1/1985 | Troy et al. |
| 4,573,681 | A | 3/1986 | Okada |
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,695,053 | A | 9/1987 | Vazquez, Jr. et al. |
| 4,721,307 | A | 1/1988 | Okada |
| 4,743,024 | A | 5/1988 | Helm et al. |
| 4,760,527 | A | 7/1988 | Sidley |

(Continued)

FOREIGN PATENT DOCUMENTS

| | | |
|---|---|---|
| AU | 524709 | 9/1982 |

(Continued)

OTHER PUBLICATIONS

Aristrocrat Brochure, written by Aristocrat Gaming, published in 2004.

(Continued)

*Primary Examiner*—John M Hotaling, III
*Assistant Examiner*—Steven J. Hylinski
(74) *Attorney, Agent, or Firm*—K&L Gates LLP

(57) ABSTRACT

A gaming system including a central server linked to a plurality of gaming machines. Upon a suitable triggering event at a triggering gaming device in the gaming system a bonus event occurs. When the bonus event occurs, the players actively playing each auxiliary gaming device in the gaming system are each provided a chance to participate in the bonus event as well. Each remaining gaming device's chance of participating in the bonus event is based on the individual accumulated bonus event pool for that gaming device.

44 Claims, 8 Drawing Sheets

U.S. PATENT DOCUMENTS 4,775,155 A 10/1988 Lees
4,805,907 A 2/1989 Hagiwara
4,837,728 A 6/1989 Barrie et al.
4,842,278 A 6/1989 Markowicz
4,856,787 A 8/1989 Itkis
4,871,171 A 10/1989 Rivero
4,880,237 A 11/1989 Kishishita
4,926,327 A 5/1990 Sidley
4,964,638 A 10/1990 Ishida
4,991,848 A 2/1991 Greenwood et al.
5,038,022 A 8/1991 Lucero
5,048,833 A 9/1991 Lamle
5,074,559 A 12/1991 Okada
5,116,055 A 5/1992 Tracy
5,123,649 A 6/1992 Tiberio
5,127,651 A 7/1992 Okada
5,158,293 A 10/1992 Mullins
5,178,390 A 1/1993 Okada
5,205,555 A 4/1993 Hamano
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A 1/1994 Tracy
5,286,023 A 2/1994 Wood
5,292,127 A 3/1994 Kelly et al.
5,321,241 A 6/1994 Craine
5,324,035 A 6/1994 Morris et al.
5,326,104 A 7/1994 Pease et al.
5,342,047 A 8/1994 Heidel et al.
5,342,049 A 8/1994 Wichinsky et al.
5,344,144 A 9/1994 Canon
5,351,970 A 10/1994 Fioretti
5,377,993 A 1/1995 Josephs
5,382,023 A 1/1995 Roberts et al.
5,393,057 A 2/1995 Marnell, II
5,398,932 A 3/1995 Eberhardt et al.
5,401,024 A 3/1995 Simunek
5,417,430 A 5/1995 Breeding
5,423,539 A 6/1995 Nagao
5,429,361 A 7/1995 Raven et al.
5,456,465 A 10/1995 Durham
5,470,079 A 11/1995 LeStrange et al.
5,472,194 A 12/1995 Breeding et al.
5,489,101 A 2/1996 Moody
5,511,781 A 4/1996 Wood
5,524,888 A 6/1996 Heidel
5,536,016 A 7/1996 Thompson
5,542,669 A 8/1996 Charron et al.
5,547,192 A 8/1996 Ishibashi
5,560,603 A 10/1996 Seelig et al.
5,564,700 A 10/1996 Celona
5,566,337 A 10/1996 Szymanski
5,570,885 A 11/1996 Ornstein
5,580,053 A 12/1996 Crouch
5,580,309 A 12/1996 Piechowiak et al.
5,584,763 A 12/1996 Kelly et al.
5,601,487 A 2/1997 Oshima
5,611,535 A 3/1997 Tiberio
5,611,730 A 3/1997 Weiss
5,626,341 A 5/1997 Jones
5,645,486 A 7/1997 Nagao et al.
5,647,798 A 7/1997 Falciglia
5,655,961 A 8/1997 Acres et al.
5,674,128 A 10/1997 Holch et al.
5,702,304 A 12/1997 Acres et al.
5,707,285 A 1/1998 Place et al.
5,707,286 A 1/1998 Carlson
5,711,525 A 1/1998 Breeding
5,722,891 A 3/1998 Inoue
5,732,948 A 3/1998 Yoseloff
5,741,183 A 4/1998 Acres et al.
5,743,800 A 4/1998 Huard et al.
5,752,882 A 5/1998 Acres et al.
5,761,647 A 6/1998 Boushy
5,762,552 A 6/1998 Vuong
5,766,076 A 6/1998 Pease et al.
5,769,716 A 6/1998 Saffari et al.
5,772,509 A 6/1998 Weiss
5,772,511 A 6/1998 Smeltzer
RE35,864 E 7/1998 Weingardt
5,775,692 A 7/1998 Watts et al.
5,779,545 A 7/1998 Berg et al.
5,779,549 A 7/1998 Walker et al.
5,788,573 A 8/1998 Baerlocher et al.
5,800,269 A 9/1998 Holch et al.
5,806,855 A 9/1998 Cherry
5,807,172 A 9/1998 Piechowiak
5,816,918 A 10/1998 Kelly et al.
5,820,459 A 10/1998 Acres et al.
5,823,874 A 10/1998 Adams
5,833,537 A 11/1998 Barrie
5,833,538 A 11/1998 Weiss
5,833,540 A 11/1998 Miodunski et al.
5,836,817 A 11/1998 Acres et al.
5,848,932 A 12/1998 Adams
5,851,011 A 12/1998 Lott
5,851,147 A 12/1998 Stupak et al.
5,851,148 A 12/1998 Brune et al.
5,851,149 A 12/1998 Xidos et al.
5,855,514 A 1/1999 Kamille
5,855,515 A 1/1999 Pease et al.
5,873,781 A 2/1999 Keane
5,876,284 A 3/1999 Acres et al.
5,882,261 A 3/1999 Adams
5,885,158 A 3/1999 Torango et al.
5,902,184 A 5/1999 Bennett et al.
5,910,048 A 6/1999 Feinburg
5,911,418 A 6/1999 Adams
5,919,088 A 7/1999 Weiss
5,941,773 A 8/1999 Harlick
5,944,606 A 8/1999 Gerow
5,947,820 A 9/1999 Morro et al.
5,947,822 A 9/1999 Weiss
5,951,011 A 9/1999 Potter et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,989,121 A 11/1999 Sakamoto
5,993,316 A 11/1999 Coyle et al.
5,997,400 A 12/1999 Seelig et al.
5,997,401 A 12/1999 Crawford
6,001,016 A 12/1999 Walker et al.
6,004,207 A 12/1999 Wilson, Jr. et al.
6,007,427 A 12/1999 Wiener
6,012,982 A 1/2000 Piechowiak et al.
6,015,346 A 1/2000 Bennett
6,019,369 A 2/2000 Nakagawa et al.
6,033,307 A 3/2000 Vancura
6,039,648 A 3/2000 Guinn et al.
6,039,649 A 3/2000 Schulze
6,048,269 A 4/2000 Burns et al.
6,050,895 A 4/2000 Luciano et al.
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.

6,068,553 A 5/2000 Parker
6,077,162 A 6/2000 Weiss
6,089,976 A 7/2000 Schneider et al.
6,089,977 A 7/2000 Bennett
6,089,978 A 7/2000 Adams
6,089,980 A 7/2000 Gauselmann
6,093,102 A 7/2000 Bennett
6,099,408 A 8/2000 Schneier et al.
6,102,798 A 8/2000 Bennett
6,110,041 A 8/2000 Walker et al.
6,110,043 A 8/2000 Olsen
6,117,013 A 9/2000 Eiba
6,120,031 A 9/2000 Adams
6,126,541 A 10/2000 Fuchs
6,126,542 A 10/2000 Fier
6,135,884 A 10/2000 Hedrick et al.
6,142,872 A 11/2000 Walker et al.
6,142,873 A 11/2000 Weiss et al.
6,142,874 A 11/2000 Kodachi et al.
6,142,875 A 11/2000 Kodachi et al.
6,146,270 A 11/2000 Huard et al.
6,146,273 A 11/2000 Olsen
6,149,156 A 11/2000 Feola
6,149,521 A 11/2000 Sanduski
6,152,823 A 11/2000 Lacoste et al.
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,162,122 A 12/2000 Acres et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,183,366 B1 2/2001 Goldberg et al.
6,186,894 B1 2/2001 Mayeroff
6,190,254 B1 2/2001 Bennett
6,190,255 B1 2/2001 Thomas et al.
6,203,010 B1 3/2001 Jorasch et al.
6,203,429 B1 3/2001 Demar et al.
6,203,430 B1 3/2001 Walker et al.
6,206,374 B1 3/2001 Jones
6,206,782 B1 * 3/2001 Walker et al. ................. 463/25
6,210,275 B1 * 4/2001 Olsen .......................... 463/16
6,210,277 B1 4/2001 Stefan
6,210,279 B1 4/2001 Dickinson
6,213,876 B1 4/2001 Moore, Jr.
6,217,448 B1 4/2001 Olsen
6,224,482 B1 5/2001 Bennett
6,224,483 B1 5/2001 Mayeroff
6,224,484 B1 5/2001 Okuda et al.
6,231,442 B1 5/2001 Mayeroff
6,231,445 B1 5/2001 Acres
6,238,288 B1 5/2001 Walker et al.
6,241,608 B1 6/2001 Torango
6,244,958 B1 6/2001 Acres
6,254,483 B1 7/2001 Acres
6,257,981 B1 7/2001 Acres et al.
6,261,177 B1 7/2001 Bennett
6,264,557 B1 7/2001 Schneier et al.
6,270,409 B1 8/2001 Shuster
6,293,866 B1 9/2001 Walker et al.
RE37,414 E 10/2001 Harlick
6,302,790 B1 10/2001 Brossard
6,302,793 B1 10/2001 Fertitta, III et al.
6,305,686 B1 10/2001 Perrie et al.
6,309,298 B1 10/2001 Gerow
6,309,300 B1 10/2001 Glavich
6,311,976 B1 11/2001 Yoseloff et al.
6,312,330 B1 11/2001 Jones et al.
6,312,332 B1 * 11/2001 Walker et al. ................. 463/23
6,312,333 B1 11/2001 Acres
6,312,334 B1 11/2001 Yoseloff
6,315,662 B1 11/2001 Jorasch et al.
6,319,122 B1 11/2001 Packes, Jr. et al.
6,319,125 B1 11/2001 Acres
6,328,649 B1 12/2001 Randall et al.
6,331,143 B1 * 12/2001 Yoseloff ...................... 463/18
6,334,814 B1 1/2002 Adams
6,336,857 B1 1/2002 McBride
6,340,158 B2 1/2002 Pierce et al.
6,346,043 B1 2/2002 Colin et al.
6,347,996 B1 2/2002 Gilmore et al.
6,358,147 B1 3/2002 Jaffe et al.
6,358,149 B1 3/2002 Schneider et al.
6,361,441 B1 3/2002 Walker et al.
6,364,766 B1 4/2002 Anderson et al.
6,364,768 B1 4/2002 Acres et al.
6,364,769 B1 4/2002 Weiss et al.
6,371,852 B1 4/2002 Acres
6,375,187 B1 4/2002 Baerlocher
6,375,567 B1 4/2002 Acres
6,375,568 B1 4/2002 Roffman et al.
6,375,569 B1 4/2002 Acres
6,398,218 B1 6/2002 Vancura
6,406,369 B1 6/2002 Baerlocher et al.
6,416,408 B2 7/2002 Tracy et al.
6,416,409 B1 7/2002 Jordan
6,419,579 B1 7/2002 Bennett
6,419,583 B1 7/2002 Crumby et al.
6,428,412 B1 8/2002 Anderson et al.
6,431,983 B2 8/2002 Acres
6,435,511 B1 8/2002 Vancura et al.
6,435,968 B1 8/2002 Torango
6,439,995 B1 8/2002 Hughs-Baird et al.
6,454,651 B1 9/2002 Yoseloff
RE37,885 E 10/2002 Acres et al.
6,461,241 B1 10/2002 Webb et al.
6,471,208 B2 10/2002 Yoseloff et al.
6,471,591 B1 * 10/2002 Crumby ....................... 463/26
6,481,713 B2 11/2002 Perrie et al.
6,506,118 B1 1/2003 Baerlocher et al.
6,533,664 B1 3/2003 Crumby
6,537,150 B1 3/2003 Luciano et al.
6,561,904 B2 5/2003 Locke et al.
6,565,434 B1 5/2003 Acres
6,569,015 B1 5/2003 Baerlocher et al.
6,572,471 B1 6/2003 Bennett
6,575,832 B1 6/2003 Manfredi et al.
6,585,592 B1 * 7/2003 Crumby ....................... 463/26
6,589,115 B2 7/2003 Walker et al.
6,592,460 B2 7/2003 Torango
6,595,853 B1 7/2003 Osawa
6,599,190 B2 7/2003 Osawa
6,599,193 B2 7/2003 Baerlocher et al.
6,602,137 B2 8/2003 Kaminkow et al.
6,607,438 B2 8/2003 Baerlocher et al.
6,607,441 B1 8/2003 Acres
6,609,973 B1 8/2003 Weiss
6,620,046 B2 9/2003 Rowe
6,626,758 B1 9/2003 Parham et al.
6,632,141 B2 10/2003 Webb et al.
6,634,944 B2 10/2003 Osawa
6,645,077 B2 11/2003 Rowe
6,648,754 B2 11/2003 Baerlocher et al.
6,648,759 B2 11/2003 Vancura
6,656,047 B1 12/2003 Tarantino et al.
6,656,048 B2 12/2003 Olsen
6,656,052 B2 12/2003 Abramopoulos et al.
6,675,152 B1 1/2004 Prasad et al.
6,692,355 B2 2/2004 Baerlocher et al.
6,712,695 B2 3/2004 Mothwurf et al.
6,712,697 B2 3/2004 Acres

| | | | | |
|---|---|---|---|---|
| 6,719,630 | B1 | 4/2004 | Seelig et al. | |
| 6,733,386 | B2 | 5/2004 | Cuddy et al. | |
| 6,733,390 | B2 * | 5/2004 | Walker et al. | 463/23 |
| 6,749,510 | B2 | 6/2004 | Giobbi | |
| 6,776,714 | B2 | 8/2004 | Ungaro et al. | |
| 6,776,715 | B2 | 8/2004 | Price | |
| 6,800,030 | B2 | 10/2004 | Acres | |
| 6,805,352 | B2 | 10/2004 | Hunter | |
| 6,832,958 | B2 | 12/2004 | Acres et al. | |
| 6,837,788 | B2 | 1/2005 | Cannon | |
| 6,887,154 | B1 * | 5/2005 | Luciano et al. | 463/26 |
| 6,899,625 | B2 | 5/2005 | Luciano, Jr. et al. | |
| 6,910,964 | B2 | 6/2005 | Acres | |
| 6,918,834 | B2 | 7/2005 | Vancura | |
| 6,939,234 | B2 | 9/2005 | Beatty | |
| RE38,812 | E | 10/2005 | Acres et al. | |
| 6,966,834 | B1 | 11/2005 | Johnson | |
| 7,008,324 | B1 * | 3/2006 | Johnson et al. | 463/42 |
| 7,172,505 | B2 * | 2/2007 | Vancura | 463/16 |
| 7,297,059 | B2 | 11/2007 | Vancura et al. | |
| 7,311,598 | B2 * | 12/2007 | Kaminkow et al. | 463/16 |
| 7,311,604 | B2 * | 12/2007 | Kaminkow et al. | 463/20 |
| 7,361,085 | B2 | 4/2008 | Packes, Jr. et al. | |
| 7,427,236 | B2 * | 9/2008 | Kaminkow et al. | 463/26 |
| 7,485,043 | B2 * | 2/2009 | Beaulieu et al. | 463/42 |
| 7,500,915 | B2 | 3/2009 | Wolf et al. | |
| 7,530,896 | B2 | 5/2009 | Gauselmann | |
| 2001/0004607 | A1 * | 6/2001 | Olsen | 463/26 |
| 2001/0018361 | A1 * | 8/2001 | Acres | 463/27 |
| 2001/0036857 | A1 * | 11/2001 | Mothwurf et al. | 463/25 |
| 2001/0049303 | A1 | 12/2001 | Found | |
| 2001/0055990 | A1 | 12/2001 | Acres | |
| 2002/0016202 | A1 * | 2/2002 | Fertitta et al. | 463/25 |
| 2002/0039923 | A1 * | 4/2002 | Cannon et al. | 463/42 |
| 2002/0058546 | A2 * | 5/2002 | Acres | 463/25 |
| 2002/0138594 | A1 | 9/2002 | Rowe | |
| 2002/0151342 | A1 | 10/2002 | Tracy et al. | |
| 2002/0152120 | A1 | 10/2002 | Howington | |
| 2002/0165023 | A1 | 11/2002 | Brosnan et al. | |
| 2002/0177483 | A1 * | 11/2002 | Cannon | 463/42 |
| 2003/0003981 | A1 * | 1/2003 | Valenti | 463/16 |
| 2003/0027625 | A1 | 2/2003 | Rowe | |
| 2003/0027630 | A1 | 2/2003 | Kelly et al. | |
| 2003/0242297 | | 2/2003 | Rowe | |
| 2003/0045350 | A1 | 3/2003 | Baerlocher et al. | |
| 2003/0060266 | A1 | 3/2003 | Baerlocher | |
| 2003/0060279 | A1 | 3/2003 | Torango | |
| 2003/0092484 | A1 | 5/2003 | Schneider et al. | |
| 2003/0100361 | A1 * | 5/2003 | Sharpless et al. | 463/25 |
| 2003/0109307 | A1 * | 6/2003 | Boyd | 463/41 |
| 2003/0119581 | A1 * | 6/2003 | Cannon et al. | 463/25 |
| 2003/0119586 | A1 * | 6/2003 | Crumby | 463/26 |
| 2003/0144965 | A1 | 7/2003 | Prasad et al. | |
| 2003/0148804 | A1 * | 8/2003 | Ikeya et al. | 463/16 |
| 2003/0148807 | A1 * | 8/2003 | Acres | 463/26 |
| 2003/0222402 | A1 | 12/2003 | Olive | |
| 2003/0224852 | A1 * | 12/2003 | Walker et al. | 463/20 |
| 2003/0228904 | A1 | 12/2003 | Acres et al. | |
| 2003/0236110 | A1 * | 12/2003 | Beaulieu et al. | 463/1 |
| 2004/0009811 | A1 | 1/2004 | Torango | |
| 2004/0072613 | A1 * | 4/2004 | Visocnik | 463/25 |
| 2004/0072615 | A1 | 4/2004 | Maya et al. | |
| 2004/0087368 | A1 | 5/2004 | Gavselmann | |
| 2004/0102243 | A1 * | 5/2004 | Olsen | 463/25 |
| 2004/0142742 | A1 * | 7/2004 | Schneider et al. | 463/25 |
| 2004/0204226 | A1 | 10/2004 | Foster et al. | |
| 2004/0214628 | A1 * | 10/2004 | Boyd et al. | 463/20 |
| 2004/0229683 | A1 * | 11/2004 | Mothwurf et al. | 463/26 |
| 2004/0242297 | A1 | 12/2004 | Walker | |
| 2005/0026669 | A1 * | 2/2005 | Nelson et al. | 463/16 |
| 2005/0032573 | A1 | 2/2005 | Acres et al. | |
| 2005/0054430 | A1 | 3/2005 | Pitman et al. | |
| 2005/0070356 | A1 | 3/2005 | Mothwurf | |
| 2005/0079911 | A1 * | 4/2005 | Nakatsu | 463/26 |
| 2005/0119044 | A1 * | 6/2005 | Lim et al. | 463/25 |
| 2005/0119047 | A1 | 6/2005 | Olive | |
| 2005/0143168 | A1 | 6/2005 | Torango | |
| 2005/0159211 | A1 | 7/2005 | Englman | |
| 2005/0176488 | A1 | 8/2005 | Olive | |
| 2005/0192083 | A1 | 9/2005 | Iwamoto | |
| 2005/0209004 | A1 | 9/2005 | Torango | |
| 2005/0239542 | A1 | 10/2005 | Olsen | |
| 2005/0267610 | A1 | 12/2005 | Shinoda | |
| 2006/0003829 | A1 | 1/2006 | Thomas | |
| 2006/0009285 | A1 * | 1/2006 | Pryzby et al. | 463/30 |
| 2006/0009291 | A1 * | 1/2006 | Martin et al. | 463/46 |
| 2006/0025210 | A1 * | 2/2006 | Johnson | 463/25 |
| 2006/0030403 | A1 * | 2/2006 | Lafky et al. | 463/27 |
| 2006/0035705 | A1 | 2/2006 | Jordan et al. | |
| 2006/0040723 | A1 * | 2/2006 | Baerlocher et al. | 463/16 |
| 2006/0040732 | A1 * | 2/2006 | Baerlocher et al. | 463/25 |
| 2006/0040733 | A1 * | 2/2006 | Baerlocher et al. | 463/26 |
| 2006/0040734 | A1 * | 2/2006 | Baerlocher et al. | 463/26 |
| 2006/0040736 | A1 * | 2/2006 | Baerlocher et al. | 463/27 |
| 2006/0046821 | A1 * | 3/2006 | Kaminkow et al. | 463/16 |
| 2006/0046822 | A1 * | 3/2006 | Kaminkow et al. | 463/16 |
| 2006/0046823 | A1 * | 3/2006 | Kaminkow et al. | 463/16 |
| 2006/0052158 | A1 * | 3/2006 | Raniere | 463/25 |
| 2006/0073870 | A1 * | 4/2006 | Cannon | 463/17 |
| 2006/0084502 | A1 * | 4/2006 | Downs et al. | 463/29 |
| 2006/0116201 | A1 * | 6/2006 | Gauselmann | 463/26 |
| 2007/0015585 | A1 * | 1/2007 | Sartini et al. | 463/42 |
| 2007/0054728 | A1 * | 3/2007 | Hood | 463/16 |
| 2007/0060316 | A1 * | 3/2007 | O'Halloran | 463/25 |
| 2007/0105619 | A1 * | 5/2007 | Kniesteadt et al. | 463/26 |
| 2007/0149292 | A1 * | 6/2007 | Kaminkow et al. | 463/46 |
| 2007/0155485 | A1 * | 7/2007 | Cuddy et al. | 463/25 |
| 2007/0202943 | A1 * | 8/2007 | Thomas | 463/27 |
| 2007/0207850 | A1 * | 9/2007 | Darrah et al. | 463/20 |
| 2008/0020817 | A1 * | 1/2008 | Kaminkow et al. | 463/16 |
| 2008/0020842 | A1 * | 1/2008 | Kaminkow et al. | 463/40 |
| 2008/0214263 | A1 * | 9/2008 | Walker et al. | 463/16 |

FOREIGN PATENT DOCUMENTS

| | | | |
|---|---|---|---|
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 70247/96 | | 4/1997 |
| AU | 680920 | | 8/1997 |
| AU | A-50327/96 | | 10/1997 |
| AU | A-63553/98 | | 10/1998 |
| AU | 199884162 | B2 | 3/1999 |
| AU | 707687 | | 7/1999 |
| AU | 709724 | | 9/1999 |
| AU | 199917318 | A1 | 9/1999 |
| AU | 711501 | | 10/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | A4 | 11/2001 |
| AU | 2001 1000033 | A4 | 11/2001 |
| AU | 748263 | | 5/2002 |
| AU | 749222 | | 6/2002 |
| AU | 754689 | | 11/2002 |
| AU | 758306 | | 3/2003 |
| AU | 199943453 | C | 4/2003 |
| DE | 3917683 | | 12/1990 |

| | | | |
|---|---|---|---|
| DE | 4200254 | | 8/1993 |
| EP | 2 139 390 | | 11/1984 |
| EP | 2 147 773 | | 5/1985 |
| EP | 2 148 135 | | 5/1985 |
| EP | 2 153 572 | A | 8/1985 |
| EP | 0 342 797 | | 11/1989 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 2118445 | | 11/1983 |
| GB | 2 137 392 | A | 10/1984 |
| GB | 1 151 054 | A | 7/1985 |
| GB | 2231189 | | 11/1990 |
| GB | 2 282 690 | | 4/1995 |
| GB | 2 328 311 | | 2/1999 |
| GB | 2 387 703 | | 10/2003 |
| JP | 7148307 | | 6/1995 |
| WO | WO 94/12256 | | 6/1994 |
| WO | WO 95/22811 | | 8/1995 |
| WO | WO 95/30944 | | 11/1995 |
| WO | WO 97 12338 | | 4/1997 |
| WO | WO 97/27568 | | 7/1997 |
| WO | WO 9732285 | | 9/1997 |
| WO | WO 98/35309 | | 8/1998 |
| WO | WO 98/47115 | | 10/1998 |
| WO | WO 98/51384 | | 11/1998 |
| WO | WO 99/03078 | | 1/1999 |
| WO | WO 99/10849 | | 3/1999 |
| WO | WO 00/12186 | | 3/2000 |
| WO | WO 00/32286 | | 6/2000 |
| WO | WO 01/10523 | | 2/2001 |
| WO | WO 01/15055 | | 3/2001 |
| WO | WO 01/15790 | A1 | 3/2001 |
| WO | PCT/US02/30858 | | 4/2003 |
| WO | WO 03/075235 | | 9/2003 |
| WO | WO 2004/066061 | A2 | 8/2004 |
| WO | WO 2005 076193 | | 8/2005 |
| WO | WO 2005/081623 | A2 | 9/2005 |
| WO | WO 2005/083599 | A1 | 9/2005 |
| WO | WO 2005/099425 | A2 | 10/2005 |
| WO | WO 2005/099845 | A1 | 10/2005 |
| WO | WO 2005/106702 | | 11/2005 |
| WO | WO 2005 113093 | | 12/2005 |

OTHER PUBLICATIONS

Auction Fever Advertisement, written by Sierre Design Group, available prior to 2004.
Bally Slot Machines Electro-Mechanicals 1964-1980 Book [In Part], Revised 3rd Edition written by Marshall Fey.
Believe it or Not Article, written by Strictly Slots, published in 2001.
Bingo Advertisement and Jackpot Bingo Advertisements, written by Casino Data Systems, published in 1998 and 2001.
Bonus Spin Diamond Fives Advertisement, written by IGT, published in 1999.
Bonus Times Article, written by Strictly Slots, published in Jul. 2000.
Boom Advertisement, written by WMS Gaming, Inc., published in 1998.
Cartoon Jackpots description, printed from www.ballygaming.com/home.asp, on Feb. 4, 2005.
Cash Box Advertisement, written by Anchor Games, published in 2000.
Cash Express Advertisements, written by Aristocrat, published in 2002.
Catalogue of Champions Advertisement, written by Aristocrat, published in 1990.
Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1991.
Court Ruling on Claim Construction in *Cynthia Jean Goff* v. *Harrah's Operating Company, Inc., et al.*, dated Dec. 30, 2005.
Fast Buck Systems Manual, written by International Game Technology, available to Mirage shift supervisors at least as early as May 30, 1990.
Integrated Real Time On-Line Slot System—SDI, written by Grips Electronic GmbH, printed from website reported as archived on Feb. 20, 1997 (available at http://web.archive.org/web/19970220165559/www.grips.com/sdi.htm).
Lemons, Cherries and Bell-Fruit-Gum, pp. 1 to 4 and 304 to 314, written by Bueschel, published in Royal Bell Books in Nov. 1995.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
M-Slot Series Primary Reel Product description from Lemons, Cherries and Bell-Fruit-Gum, written by Richard M. Bueschel, published in 1995.
PEM—Precision Electronic Meter, written by Grips Electronic GmbH, printed from website reported as archived on Feb. 20, 1997 (available at http://web.archive.org/web/19970220165753/www.grips.com/pem.htm).
Player Tracking on Slots, written by Grips Electronic GmbH, printed from website reported as archived on Feb. 20, 1997 (available at http://web.archive.org/web/19970220165921/www.grips.com/playtrac.htm).
ProLINK Progressive Controller User/Reference Manual, written by Casino Data Systems, published in Apr. 1997.
Statement of Grounds and Particulars in Support of Opposition, from Australian Patent Application 754689 in the name of Aristocrat Technologies Australia Pty Ltd. and Opposition thereto by Acres Gaming, Inc., dated May 21, 2003.
Statutory Declaration of John Boris Golja from Australian Patent Application 754689 in the name of Aristocrat Technologies Australia Pty Ltd. and Opposition thereto by Acres Gaming, Inc., dated May 21, 2004.
Statutory Declaration of Phillip Charles Dimond, from Australian Patent Application 754689 in the name of Aristocrat Technologies Australia Pty Ltd. and Opposition thereto by Acres Gaming, Inc., dated Mar. 2, 2005.
Statutory Declaration of Scott Olive, from In the matter of Aristocrat Technologies Australia Pty Ltd. Opposition to Patent Application 765084 Acres Gaming Inc., dated May 9, 2005.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
U.S. Appl. No. 60/035,513 by Torango and Lannoy, filed Jan. 15, 1997 and referenced by U.S. Patent Nos. 6,435,968, 6,241,608 and 6,592,460.
U.S. Appl. No. 60/040,982 by Torango and Lannoy, filed Mar. 17, 1997 and referenced by U.S. Patent Nos. 6,435,968, 6,241,608 and 6,592,460.
U.S. Appl. No. 60/050,971 by Torango and Lannoy, filed Jun. 19, 1997 and referenced by U.S. Patent Nos. 6,435,968, 6,241,608 and 6,592,460.
Wide Area Progressive Link System, written by Grips Electronic GmbH, printed from website reported as archived on Feb. 20, 1997 (available at http://web.archive.org/web/19970220165457/www.grips.conn/wap.htm).

* cited by examiner

GAMING SYSTEM WHICH PROVIDES MULTIPLE PLAYERS MULTIPLE BONUS AWARDS

PRIORITY CLAIM

This application is a continuation patent application that claims priority to and the benefit of U.S. patent application Ser. No. 11/219,949, filed on Sep. 6, 2005, the entire contents of which is incorporated herein.

This application relates to the following co-pending commonly owned patent applications: "GAMING SYSTEM AND METHOD FOR PROVIDING GROUP PLAY WITH DIVIDED BONUS FEATURES," Ser. No. 11/557,394; "GAMING SYSTEM WHICH PROVIDES MULTIPLE PLAYERS MULTIPLE BONUS AWARDS," Ser. No. 11/557,437; "GAMING SYSTEM AND METHOD FOR PROVIDING MULTIPLE PLAYERS MULTIPLE BONUS AWARDS," Ser. No. 11/557,412; "GAMING SYSTEM AND METHOD FOR PROVIDING MULTIPLE PLAYERS MULTIPLE BONUS AWARDS," Ser. No. 11/830,035; "GAMING SYSTEM AND METHOD FOR PROVIDING MULTIPLE PLAYERS MULTIPLE BONUS AWARDS," Ser. No. 11/830,056; "GAMING SYSTEM AND METHOD FOR PROVIDING GROUP PLAY WITH DIVIDED BONUS FEATURES," Ser. No. 11/830,044; and "GAMING SYSTEM WHICH PROVIDES MULTIPLE PLAYERS MULTIPLE BONUS AWARDS," Ser. No. 11/830,064.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary. For instance, the gaming machine may allow the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Certain secondary or bonus games are activated automatically. Other secondary or bonus games require player activation. Once activated, certain secondary or bonus games play to the end or final bonus award automatically. Other secondary or bonus games require at least some level of player interaction which may vary. In certain secondary or bonus games, the player may need to pick selections. In some secondary or bonus games, the player is required to make one or more decisions, such as whether to risk one amount for a higher amount. From the triggering of these secondary or bonus games to the end of these secondary or bonus games, the player is generally provided indications, instructions and information about the play of these secondary or bonus games. These indications, instructions and information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Certain awards are also available to multiple gaming machines or groups of gaming machines. These awards are sometimes displayed on a single display for multiple gaming machines. For instance, progressive awards associated with gaming machines are also known. A progressive award is an award amount which includes an initial amount funded by a casino and an additional amount funded through a portion of each wager made on the progressive award associated gaming machine. For example, 1% of each wager on the primary game of the gaming machine may be allocated to the progressive award or progressive award fund. Individual progressive slot machines have a self-contained jackpot, wherein the jackpot grows with every play. A linked progressive gaming system includes two or more slot machines connected to a common jackpot, each of which individually contribute to the jackpot.

The progressive award grows in value as more players play the gaming machine and more portions of the players' wagers are allocated to the progressive award. The jackpots can reach sizeable amounts such as $1 million or much higher amounts before a player hits or wins the jackpot. Such sizeable jackpots are very attractive to players. As the jackpot grows, so does the overall expected payout percentage of the game. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above.

The multiple gaming machines which may win a progressive award may be in the same bank of machines, in the same casino, in the same gaming establishment (usually through a local area network ("LAN")), in two or more different casinos or in two or more different gaming establishments (usually through a wide area network ("WAN")). Such progressive awards are sometimes called local area progressives ("LAP") and wide area progressives ("WAP"), respectively. Regardless of the type of progressive, known gaming machines typically require the player to play the maximum bet to be eligible to win the progressive jackpot. Even on a single payline dollar machine, the maximum bet can be $5 (max bet on many slot machines is 5 credits per payline). Many players who are not willing to wager the required amount, or not consistently willing to wager such an amount, are thus excluded from having an opportunity to win the progressive jackpot and enjoy its associated payout increase. These progressive awards enable multiple players to build a potential award as game play continues.

While such bonus awards are popular amongst players, a number of problems exist with these known gaming systems. First, only one person typically wins the bonus award. This may discourage the other players who have been also been playing for a long period of time. Additionally, when a bonus award is won, the other players often have a difficult time figuring out who won the bonus award.

Mystery bonus awards are also known. For instance, U.S. Pat. Nos. 5,655,961, 5,702,304, 5,741,183, 5,752,882, 5,820, 459, 5,836,817, 5,876,284, 6,162,122, 6,257,981, 6,319,125, 6,364,768, 6,375,569, 6,375,567, RE37,885 and U.S. Pat. No. 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

There is a continuing need to provide new and different gaming machines and gaming systems as well as new and different ways to provide awards to players including bonus awards. There is also a continuing need to provide new and different linked or related gaming machines.

SUMMARY

In one embodiment, the gaming system disclosed herein includes a central server or controller in communication with or linked to a plurality of gaming machines or gaming devices. In another embodiment, the gaming system includes a plurality of linked gaming machines, wherein one of the gaming machines functions as the central server or controller.

In one embodiment, upon a suitable triggering event at a first gaming device in the gaming system (referred to herein as the "triggering gaming device") a bonus event occurs. When the bonus event occurs, the players actively playing one or more of the other gaming devices in the gaming system (referred to herein as the "auxiliary gaming devices") are each provided a chance to participate in the bonus event as well. In one embodiment, each gaming device includes an individual pool or meter of accumulated wagers and each auxiliary gaming device's chance of participating in the bonus event is based on the individual accumulated bonus event pool for that gaming device. Accordingly, one embodiment of the gaming system and method disclosed herein guarantees that the triggering gaming device (i.e., the gaming device which triggered that bonus event) will participate in the bonus event and one, more or each auxiliary active gaming device (i.e., each gaming device which did not trigger that bonus event) is guaranteed a chance to participate in the bonus event, wherein such a chance is based on the amount of wagers previously placed at the individual gaming device by the current players. That is, the gaming system and method of implementing the gaming system disclosed herein enables a plurality of players at a plurality of gaming devices to each participate in a bonus event, regardless of which gaming device in the gaming system triggered the occurrence of the bonus event.

It should be appreciated that as each gaming device in the gaming system may be designated as either the triggering gaming device (i.e., a gaming device which causes or is otherwise directly associated with the triggering event) or an auxiliary gaming device (i.e., a gaming device which did not cause, is not associated with or indirectly associated with the triggering event), upon the occurrences of different bonus events, the same gaming device may have different designations. That is, for a first bonus event, a first of the gaming devices in the gaming system may be designated as the triggering gaming device (and thus guaranteed to participate in the first bonus event), but for a second bonus event, the first gaming device may be designated as an auxiliary gaming device (and thus not guaranteed to participate in the second bonus event). Similarly, for a first bonus event, a second of the gaming devices in the gaming system may be designated as an auxiliary gaming device (and thus not guaranteed to participate in the first bonus event), but for a second bonus event, the second gaming device may be designated as the triggering gaming device (and thus guaranteed to participate in the second bonus event).

In one embodiment, each gaming device in the gaming system is associated with or otherwise maintains a separate gaming device accumulated bonus event pool, wherein each gaming device accumulated bonus event pool is individually funded as a percentage of the total or partial amounts wagered at that individual gaming device. In one embodiment, each gaming device includes a separate coin-in or wager meter which tracks the total or partial coin-in or wagers placed on the primary games played at that gaming device. In another embodiment, the central controller includes a separate coin-in or wager meter for each individual gaming machine which tracks the total or partial coin-in or wagers placed on the primary games for each of the gaming machines in the gaming system (i.e., the central controller maintains a gaming device accumulated bonus event pool for each gaming machine in the gaming system). In another embodiment, the central controller maintains a separate accumulated bonus event pool for each player which is tracked via a player tracking system (implemented through the use of a playing tracking card or any other suitable manner or suitable system). In this embodiment, if a player leaves a gaming machine of the gaming system, that player's wagered amounts and accumulated bonus event pool are saved for the player (via the player tracking system, the player tracking card or any other suitable system) for later use at another gaming machine. It should be appreciated that the wagers placed are tracked in any suitable compatible or comparable manner such as credits wagered (i.e., if all of the system gaming machines are of the same denomination) or monetary units (e.g., total dollars or other currency) wagered. It should be further appreciated that tracking in monetary units accounts for gaming machines having multi-denominations and/or for gaming machines of different denominations and/or gaming machines which accept different currencies.

In operation, upon a suitable triggering event at a first gaming device in the gaming system, the central controller causes a bonus event to occur. For the occurrence of this bonus event, the first gaming device is designated the triggering gaming device. The designation as the triggering gaming device ensures that gaming device success in the bonus event participation gaming sequence (as described below) and thus insures participation in the triggered bonus event. In one embodiment, the suitable triggering event is the generation of a designated symbol or symbol combination in a primary game of the triggering gaming device. In another embodiment, the triggering of the bonus event occurs independent of any game play event which may occur in any primary game or any secondary game played at one or more gaming machines in the gaming system.

In addition to the triggering gaming device gaining entrance into the bonus event, upon the triggering of the bonus event, the central controller also determines which of the other gaming devices in the gaming system shall be provided with a chance to participate in the bonus event. In one embodiment, the central controller determines the status of the gaming devices in the gaming system and provides each gaming device which is in active status a chance to participate in the bonus event. In this embodiment, upon the triggering of a bonus event, each gaming machine is determined to be in either active status or enrolled or inactive status. Active status means that the gaming machine is being actively played by a player, wherein the active status requirements can be based on any suitable number of satisfied criteria or defined in any suitable manner by the implementer of the gaming system. For example, the current level of a gaming device's accumulated bonus event pool (i.e., is the accumulated bonus event pool at or above a designated threshold wager level) may be part of the determination of whether that gaming machine is in the active status. In another example, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In another embodiment, each auxiliary gaming device is automatically provided a chance to participate in the bonus event. In another embodiment, a designated number of auxiliary gaming devices are each automatically provided a chance to participate in the bonus event. In another embodiment, to be provided a chance to participate in the bonus event, a gaming device's accumulated bonus event pool must equal or exceed a threshold amount. It should be appreciated that any suitable manner of determining which auxiliary gaming devices are provided a chance to participate in the bonus event may be implemented in accordance with the gaming system and method disclosed herein.

After determining which gaming devices will be provided a chance to participate in the bonus event, one, more and preferably each of such gaming devices participate in a separate or independent bonus event participation sequence or sub-game to determine which gaming devices actually will participate in the bonus event. That is, each gaming device selected to provide a chance to participate in the bonus event (along with the triggering gaming device which caused the triggering of the bonus event) initiates and displays a common bonus event participation gaming sequence or interface, such as the selection sub-game described below, wherein each player's odds of success in the bonus event participation gaming sequence is or can be varied based on one or more factors.

In one embodiment, the odds of success for one, more or each gaming device in the bonus event participation gaming sequence (i.e., and actually gaining entry to participate in the bonus event) is based on the accumulated bonus event pool of each respective gaming device. That is, the greater the accumulated wagers in a gaming device's associated accumulated bonus event pool, the greater the odds of success in the bonus event participation gaming sequence for that gaming device. It should be appreciated that since the triggering gaming device is guaranteed entry into the bonus event, the odds of success for the triggering gaming device in the bonus event participation gaming sequence is 100%. That is, regardless of anything the player of the triggering gaming device may do during the bonus event participation gaming sequence, the player of such triggering gaming device is ensured of entrance into the bonus event. In one embodiment, the player at the triggering gaming device is displayed or provided a different bonus event participation gaming sequence than the bonus event participation gaming sequence displayed to one, more or each of the auxiliary gaming devices. For example, the bonus event participation gaming sequence displayed by the triggering gaming device includes a determination of an appropriate multiplier to apply to any bonus award provided to the player of such triggering gaming device. Accordingly, the bonus event participation gaming sequence provides that a plurality of gaming devices will each have a chance to participate in the bonus event and the actual chance of participating in the bonus event can or will be varied based on the individual gaming device.

In one embodiment, each auxiliary gaming device displays a separate bonus event participation gaming sequence, however in this embodiment, zero, one or more of the auxiliary gaming devices are associated with a 0% of success in the bonus event participation gaming sequence. In another embodiment, none of the auxiliary gaming devices display the bonus event participation gaming sequence.

In one embodiment, after determining which gaming devices will be provided a chance to participate in the bonus event, each gaming device provided such a chance is displayed a plurality of selections in a bonus event participation gaming sequence. Each selection is associated with an entry into the bonus event, an entry into the bonus event with an associated modifier or a non-entry into the bonus event. In one embodiment, the odds of each selection being associated with an entry into the bonus event (with or without the associated modifier) is based on the accumulated bonus event pool of that gaming device. In this embodiment, the greater the accumulated wagers in a gaming device's associated accumulated bonus event pool, the greater the number of selections associated with entries into the bonus event (and thus the greater the chances of that gaming device participating in the bonus event). For example, if the average payout in the bonus event is one-hundred, then an active gaming device with twenty credits accumulated in its associated accumulated bonus event pool is provided a one-in-five chance of qualifying to participate in the bonus event. In this example, if the active gaming device displays ten selections to the player of such gaming device, then two selections will be associated with an entry into the bonus event (with or without the associated modifier) and eight selections will be associated with non-entries into the bonus event. It should be appreciated that since the triggering gaming device is guaranteed entry into the bonus event, each of the plurality of selections displayed by this gaming device are associated either with an entry into the bonus event or with an entry into the bonus event and an associated modifier. That is, regardless of which selection is picked at the triggering gaming device, the player of such gaming device is insured of entrance into the bonus event.

After displaying a plurality of selections at each active gaming machine, the player at each active gaming machine (including the triggering gaming device) is enabled the pick one of the displayed selections. The entry or non-entry into the bonus event associated with the picked selection is revealed. If a non-entry is revealed, then that gaming device will not participate in the bonus event. If an entry in the bonus event without an associated modifier is revealed, then that gaming device will participate in the bonus event and any bonus event award determined during the bonus event will be provided to the player. If an entry in the bonus event with an associated modifier is revealed, that gaming device will participate in the bonus event and any bonus event award determined during the bonus event will be modified by the associated modifier and such modified bonus event award will be provided to the player.

After determining which gaming devices will participate in the bonus event, the central controller will initiate the bonus event. In one embodiment, a bonus event award, such as a bonus event value, is determined for each gaming device participating in the bonus event. In one embodiment, the bonus event award determined for each gaming device participating in the bonus event is based, at least in part, on the accumulated bonus event pool for that gaming device. In another embodiment, an independent bonus event award is determined for each participating gaming device. In another embodiment, one, more or each bonus event awards is determined, at least in part, on one of the bonus event awards determined at at least one of the other participating gaming devices in the gaming system. In one such embodiment, the bonus event utilizes a shared device, such as the wheel, to determine one, more or each bonus event awards. It should be appreciated that any suitable manner of determining a bonus event award may be implemented.

After determining a bonus event award for each participating gaming device, any revealed modifiers are appropriately applied to any bonus event awards. That is, if a player picked selection at a gaming device revealed an associated modifier, the revealed modifier is applied to the bonus event award determined for such gaming device. Each of the bonus event awards (whether modified or not) are provided as to the respective players at such gaming devices and the bonus event ends.

In one embodiment, after the bonus event ends, the gaming device accumulated bonus event pool for each active gaming device that participated in the actual bonus event is decreased or reduced by a theoretical bonus event award regardless of the actual bonus event award provided to the player. In this embodiment, upon the triggering of the bonus event, for each active gaming device, a theoretical bonus event award is determined based on the accumulated bonus event pool of that gaming device and it is this theoretical bonus event award (and not the actual bonus event award) which is subtracted from the accumulated bonus event pool. In another embodiment, after the bonus event ends, the gaming device accumulated bonus event pool for each active gaming device that participated in the actual bonus event is reset to a designated amount, such as zero. In another embodiment, after each bonus event, the gaming device accumulated bonus event pool for each active gaming device which participated in the bonus event participation gaming sequence is reset to a designated amount, such as zero. In another embodiment, after each bonus event, the gaming device accumulated bonus event pool for one, more or each active gaming device is reset to a designated amount, such as zero. In another embodiment, after each bonus event, the gaming device accumulated bonus event pool for the triggering gaming device is reset to a designated amount, such as zero. In another embodiment, after each bonus event, the gaming device accumulated bonus event pool for the triggering gaming device is not reset.

The gaming system disclosed herein contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming machines, bonus events and bonus event awards.

Accordingly, the gaming system and method disclosed herein provides a multi-player gaming environment wherein the success of one player benefits one, more or all active players in the same group. In other words, the player at the gaming device that caused the triggering of the bonus event is guaranteed entry into the bonus event, while the players at the other active gaming devices are provided a chance game to qualify to participate in the bonus event, wherein the odds of qualifying are based on the accumulated bonus event pool associated with that gaming device. This creates an atmosphere of support among players as well as providing players with the appearance of multiple bonus events. That is, players at the gaming devices of the disclosed gaming system should not feel they are competing with one or more other players for part or all of the bonus event awards. It should be appreciated that while the players will each be given the chance at these multiple bonus events, the payouts in these bonus events may still be controlled and funded from the wagers placed at the individual gaming machine. This provides control to the game designer in allowing for a game that has a high rate of bonuses and a high volatility while being funded by each individual gaming machine.

Accordingly, an advantage of the gaming system disclosed herein is to provide a gaming system having a plurality of gaming devices wherein multiple bonus event awards can be provided simultaneously or substantially simultaneously to players based on a single occurrence of a bonus triggering event.

Another advantage is to provide a gaming system having a plurality of gaming devices which each employ a gaming device accumulated bonus event pool which determine, at least in part, the odds of each active gaming device qualifying to participate in the bonus event.

Additional features and advantages are described in, and will be apparent from, the following Detailed Description and the figures.

DETAILED DESCRIPTION

In one embodiment, the gaming system disclosed herein includes a plurality of bonus event awards provided to players of the linked gaming machines in an apparently random fashion to the players of these gaming machines. These awards are referred to herein as bonus event awards to distinguish them from the awards that the gaming machines provide to the players for winning outcomes in the plays of the primary wagering games, such as slot games, card games (e.g., poker, blackjack) or any other suitable game.

In one embodiment, the gaming devices of the gaming system are operable to provide multiple bonus event awards to multiple players at the multiple linked gaming devices at the same time or substantially the same time. Alternatively, the gaming devices of the gaming system are operable to provide multiple bonus event awards to multiple players at the multiple linked gaming devices in an overlapping or sequential manner.

Figure 1:
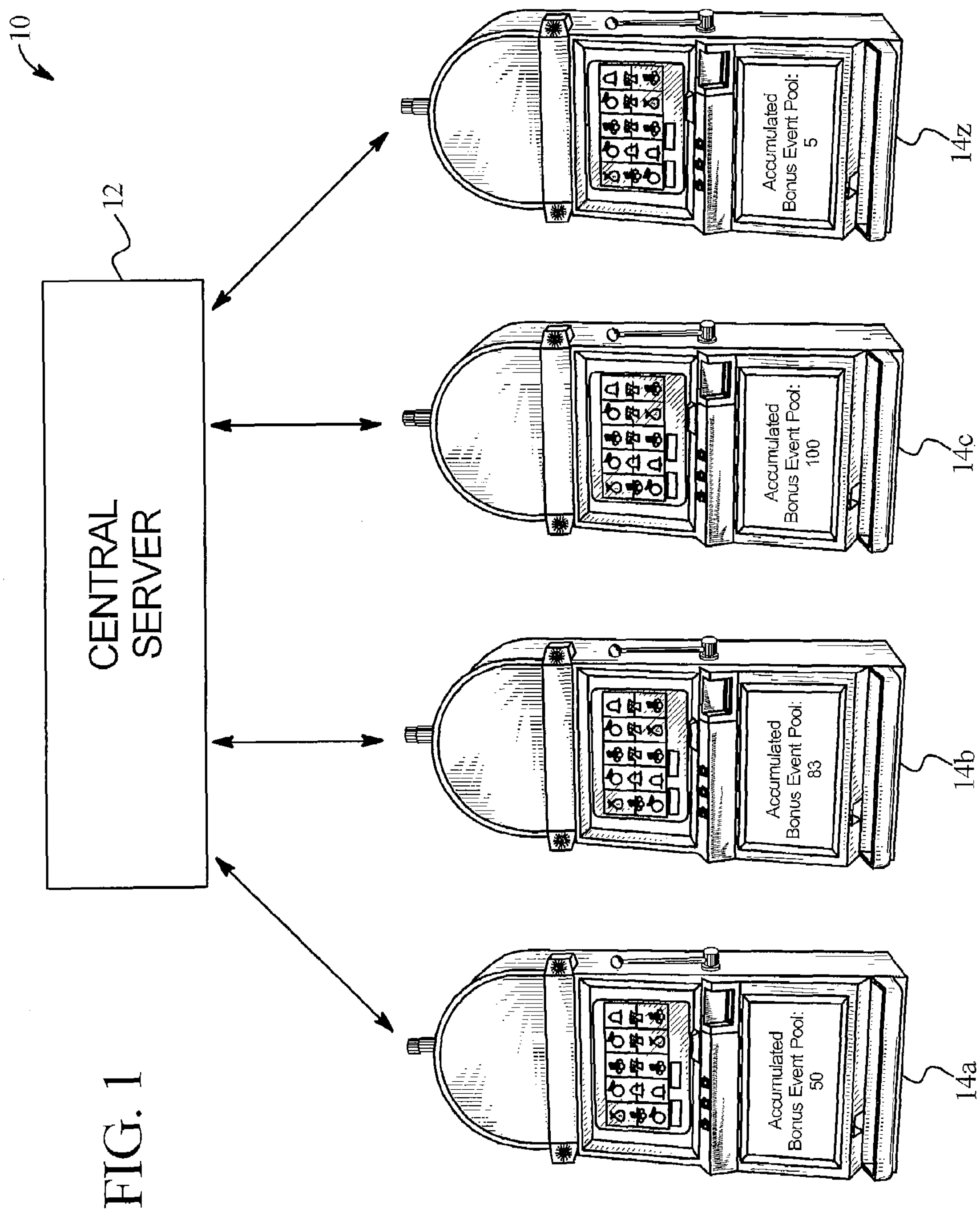
FIG. 1 is a schematic diagram of the central server in communication with a plurality of gaming machines in accordance with one embodiment of the gaming system disclosed herein.

Referring to FIG. 1, one embodiment of the gaming system 10 includes a central server or controller 12 and a plurality of gaming machines or gaming devices 14*a*, 14*b*, 14*c* . . . 14*z* in communication with or linked to the central server or processor 12 through a data network or a remote communication link. The linked gaming machines may be of the same type or of different types of gaming machines. The linked gaming machines may have the same primary game or two or more different primary games.

The number of gaming machines in the gaming system can vary as desired by the implementer of the gaming system. These gaming machines are referred to herein alternatively as the group of gaming machines, the linked gaming machines or the system gaming machines. The play of each of the gaming machines in the group is monitored by the central server 12. That is, the central server or controller maintains or keeps track of the play and/or other activity on or relating to the gaming machines in the gaming system. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. It should be appreciated that the player of a gaming machine may change during this tracking and that this tracking can be independent of the specific player playing the gaming machine. In one embodiment, as described below, the central server determines the status of each of the gaming machines in the group based on this information. It should be further appreciated that other information may be employed by the central server or controller to determine the status of each of the gaming machines in the group. For instance, the number of games played or the amount of each wager placed on each play may be used in the determination of the status of each gaming machine. The central server or controller may be any suitable server or computing device which includes a processor and a memory or storage device. In alternative embodiments, the central server is a progressive controller or another gaming machine in the gaming system. The terms central server and controller are used interchangeably herein.

Figure 2A:
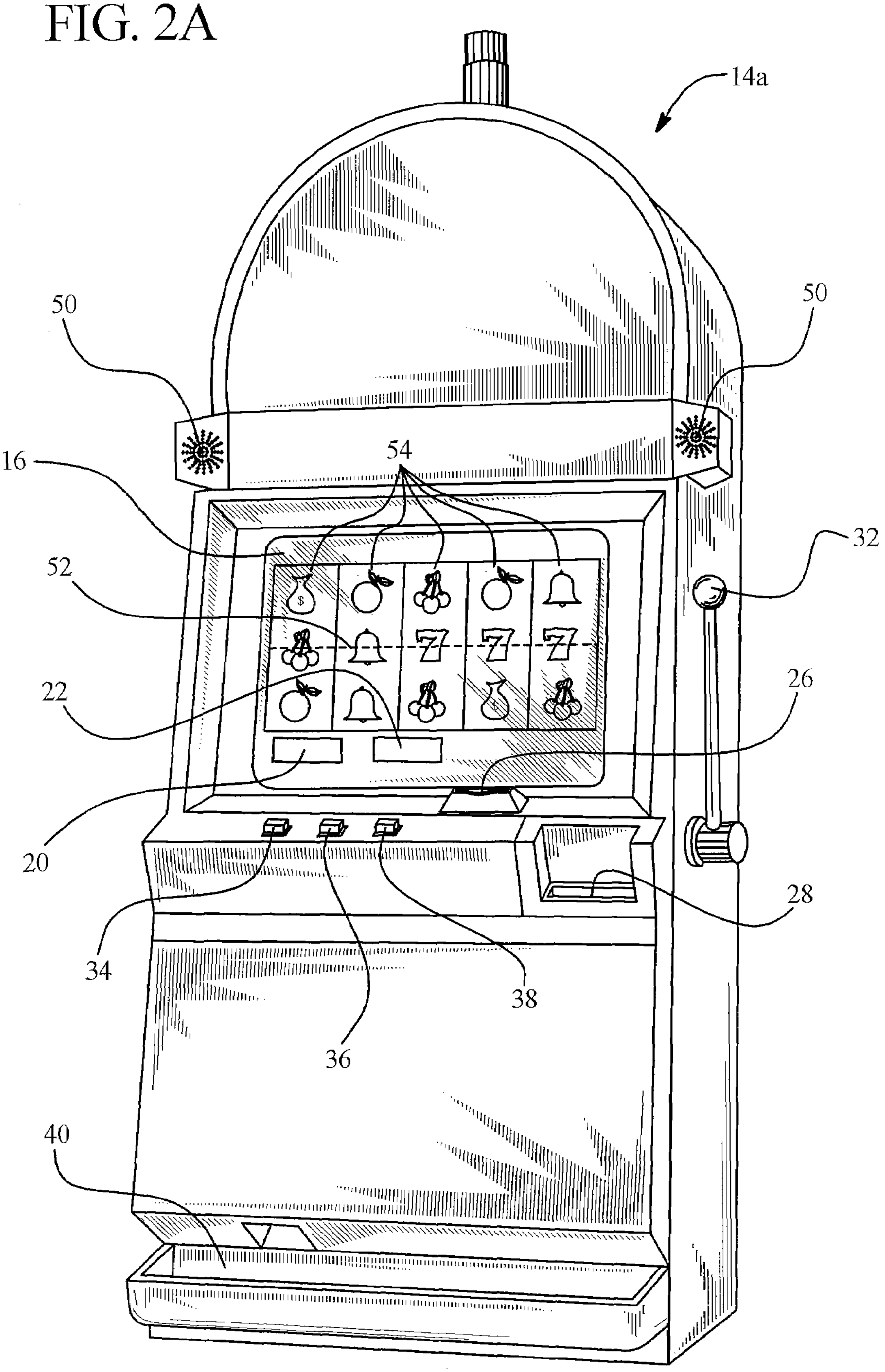
FIGS. 2A and 2B are front perspective views of alternative embodiments of gaming devices disclosed herein.
Figure 2B:
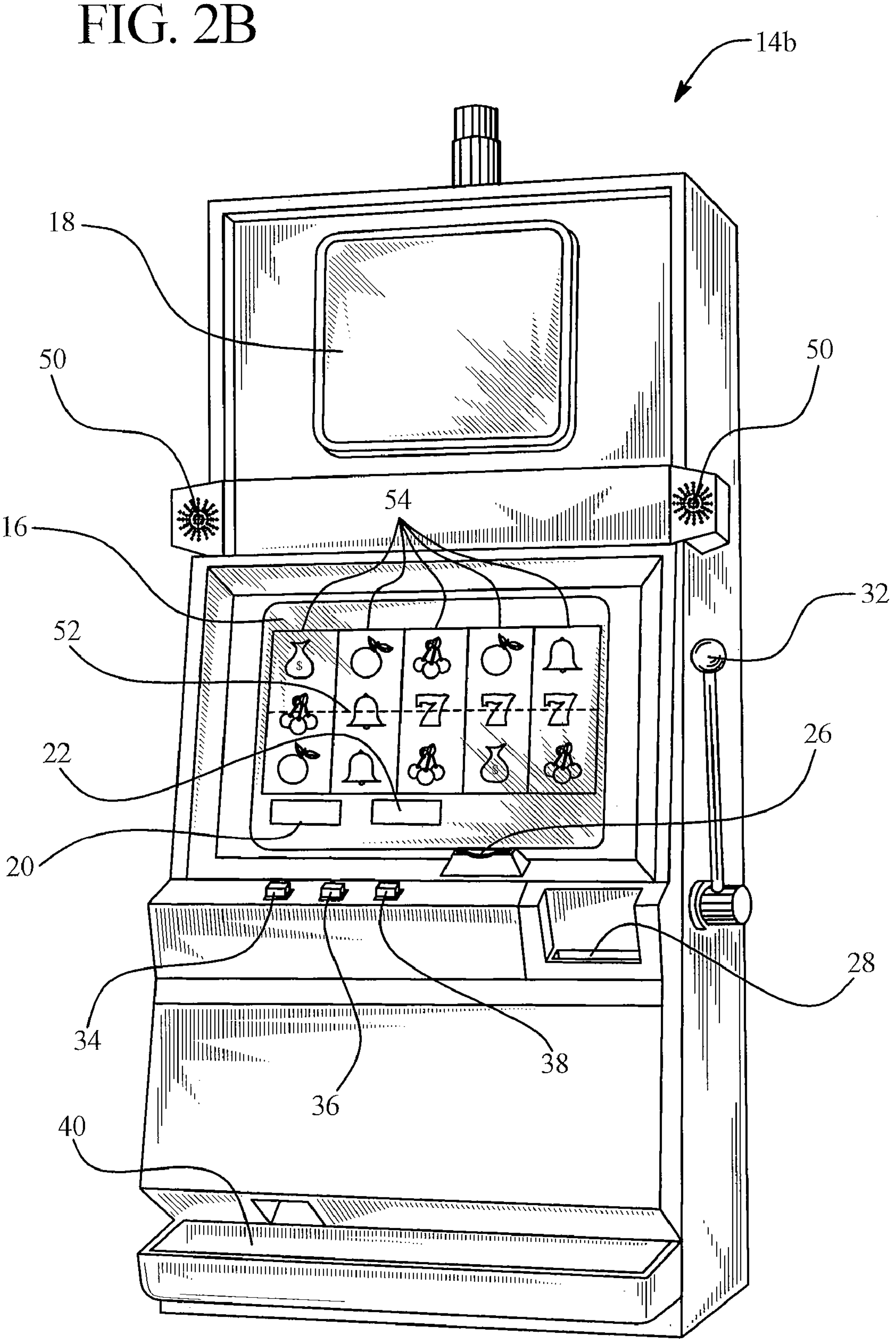

Two alternative embodiments of the gaming devices of the gaming system are illustrated in FIGS. 2A and 2B as gaming device 14*a* and gaming device 14*b*, respectively. Gaming device 14*a* and/or gaming device 14*b* are generally referred to herein as gaming device 14.

In one embodiment, as illustrated in FIGS. 2A and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

Figure 3:
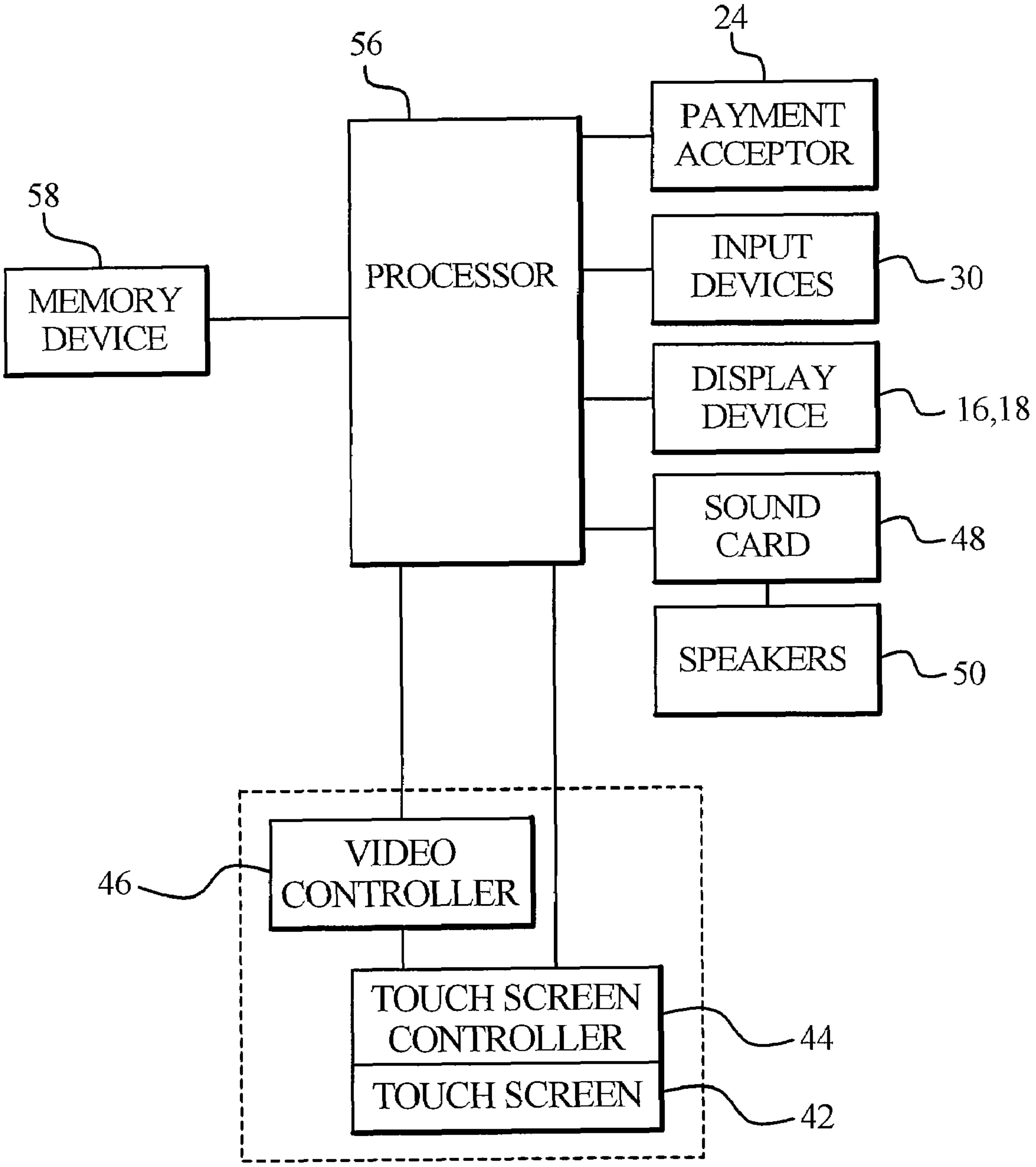
FIG. 3 is a schematic block diagram of the electronic configuration of one embodiment of a gaming device disclosed herein.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any secondary game associated with the primary game as well as information relating to the primary or secondary game. The alternative embodiment shown in FIG. 2B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 3, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

In one embodiment, the game outcome provided to the player is determined by the central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a intermittent award in addition to any award provided for winning the bingo game as described above. In this embodiment, if one or more elements are marked in intermittent patterns within a designated number of drawn elements, a intermittent award or value associated with the marked intermittent pattern is provided to the player as part of the predetermined game outcome. For example, if the four corners of a bingo card are marked within the first twenty selected elements, an intermittent award of $10 is provided to the player as part of the predetermined game outcome. It should be appreciated that in this embodiment, the player of a gaming device may be provided an intermittent award regardless of if the enrolled gaming device's provided bingo card wins or does not win the bingo game as described above.

In another embodiment, one or more of the gaming devices are in communication with the central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with the central server or controller. In one embodiment, the memory device of the central controller stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Gaming Device Accumulated Bonus Event Pools

In one embodiment, each gaming device in the gaming system is associated with or otherwise maintains a separate gaming device accumulated bonus event pool. In this embodiment, each gaming device accumulated bonus event pool is individually funded as a percentage of the amounts wagered at that individual gaming device. That is, each gaming device accumulated bonus event pool starts at a designated level, such as $0 and increases or accumulates based on a small percentage (such as 0.1%) of coin-in or wagered amounts at that gaming device. For example, as illustrated in FIG. 1, a first gaming device 14*a* is associated with a first gaming device accumulated bonus event pool with 50 accumulated wagered monetary units, a second gaming device 14*b* is associated with a second gaming device accumulated bonus event pool with 83 accumulated wagered monetary units, a third gaming device 14*c* is associated with a third gaming device accumulated bonus event pool with 100 accumulated wagered monetary units and another gaming device 14*z* is associated with another gaming device accumulated bonus event pool with 5 accumulated wagered monetary units.

In one embodiment, each gaming device includes a separate coin-in or wager meter which tracks the total or partial coin-in or wagers placed on the primary games played at that gaming device. In another embodiment, the central controller includes a separate coin-in or wager meter for each individual gaming machine which tracks the total or partial coin-in or wagers placed on the primary games for each of the gaming machines in the gaming system (i.e., the central controller maintains a gaming device accumulated bonus event pool for each gaming machine in the gaming system). In one embodiment, as described below, since the amounts allocated to the accumulated bonus event pools will theoretically be returned to the players of such gaming devices, the percentage of wagers placed allocated to the accumulated bonus event pools is determined by subtracting the desired hold percentage for a gaming device from the configured hold percentage for that gaming device. For example, if a gaming device is configured to hold 10%, on average, of wagers placed (i.e., the gaming device pays back 90%, on average, of wagers placed) but the gaming system operator determines that they want to only hold 5%, on average, of wagers placed (i.e., the gaming system operator desires the gaming devices to pay back 95%, on average, of wagers placed), 5% of the wagers placed at each gaming device are allocated to that gaming device's accumulated bonus event pool. It should be appreciated that the wagers placed are tracked in any suitable compatible or comparable manner such as credits wagered (i.e., if all of the system gaming machines are of the same denomination) or monetary units (e.g., total dollars or other currency) wagered. It should be appreciated that tracking in monetary units accounts for gaming machines having multi-denominations and/or for gaming machines of different denominations and/or gaming machines which accept different currencies.

In one embodiment, the relative amount of the wager meters for the gaming machines vary based on other factors such as the desire to reward a player who has a higher gaming status than other players. For instance, if a player has a higher level status or player tracking card, the player may be provided more monetary units in the gaming device accumulated bonus event pool of the gaming device which the player is playing. Thus, in one embodiment, the gaming device accumulated bonus event pool for a gaming machine may be set or reset to a seed amount or to include a seed amount based on the status of the player or one or more other factors. Alternatively, credits or monetary units may be added to the players total wagered amounts to give a player an advantage.

In another embodiment, the central controller maintains a separate accumulated bonus event pool for each player which is tracked via a player tracking system (implemented through the use of a playing tracking card or any other suitable manner). That is, the wagers are accumulated based on individual players instead of gaming machines. In this embodiment, the gaming system is configured to track each player's total or partial wagers and base that player's odds of success in the bonus event participation gaming sequence, as described below, on the player's individual accumulated bonus event pools. In this embodiment, if a player leaves the gaming machine of the gaming system, that player's wagered amounts are saved for the player for later use at another gaming machine. In one embodiment, if the player leaves a gaming machine of the gaming system, the player's wagers are retained through the playing tracking system or the player tracking card until a designated time or event. In another embodiment, if the player leaves a gaming machine of the gaming system without transferring the wagers allocated to their personal individual accumulated bonus event pool using the player tracking system (e.g., the player is not registered in the player tracking system or the player does not have a playing tracking card), the gaming system sets certain criteria which must be fulfilled to reset their individual accumulated bonus event pool.

Determination of Bonus Events

Figure 4:
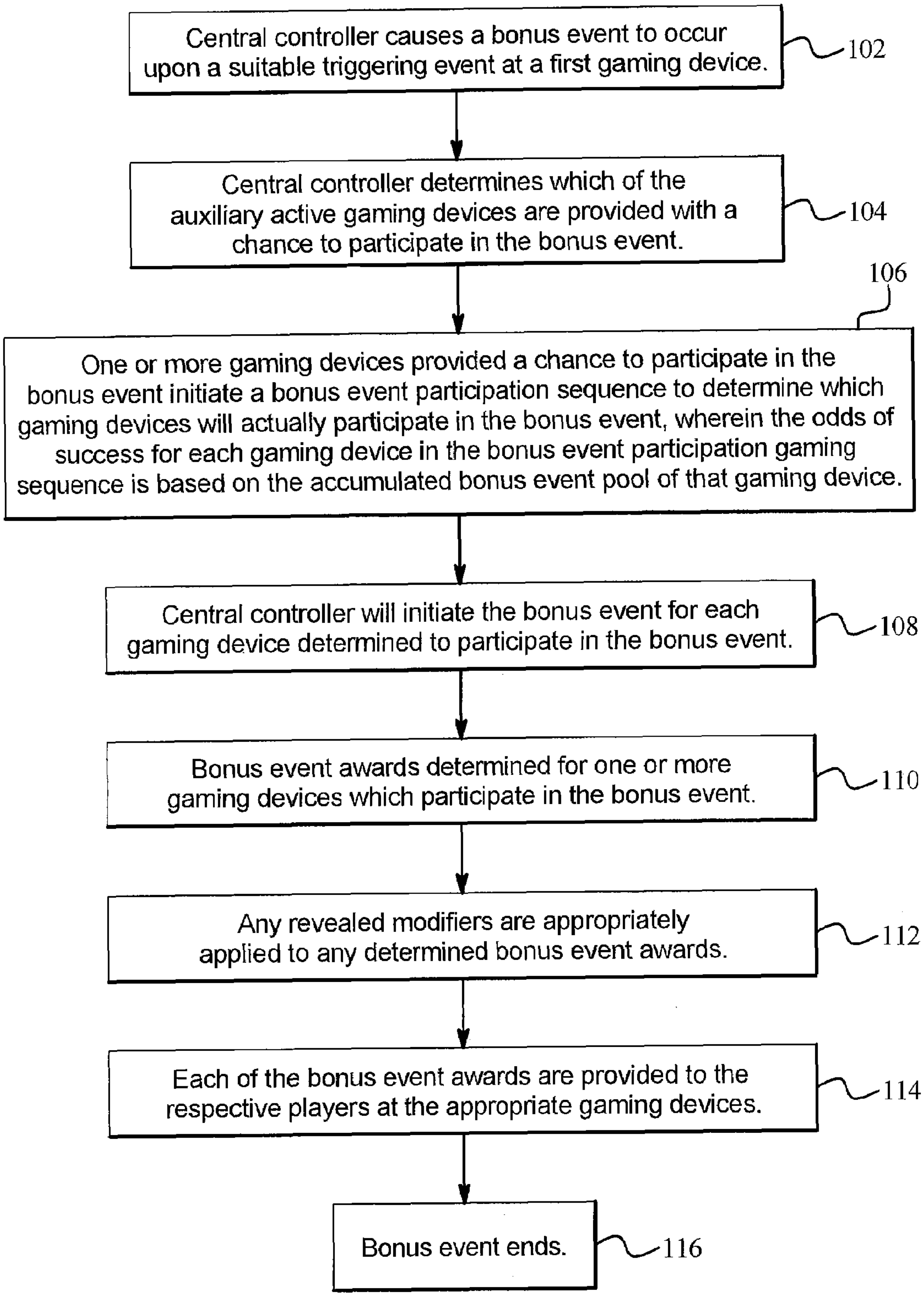
FIG. 4 is a flowchart of a one embodiment of the gaming system disclosed herein illustrating the triggering of a bonus event to the providing of one or more bonus event awards.

In one embodiment, upon a suitable triggering event at a first gaming device 14*a* in the gaming system (i.e., the gaming device designated as the triggering gaming device for this bonus event), the central controller causes a bonus event to occur as indicated in block 102 of FIG. 4. As described below, by causing the bonus event to occur, the triggering gaming device is guaranteed entrance into the subsequently occurring bonus event. In one embodiment, the triggering of the bonus event occurs through a game play event, such as the generation of a designated symbol or symbol combination or any other suitable symbol-driven trigger, at an individual gaming machine in the gaming system. In another embodiment, the triggering of the bonus event occurs independent of any game play event which may occur in any primary game or any secondary game played at one or more gaming machines in the gaming system. It should be appreciated that any suitable manner of triggering the bonus event may be implemented with the gaming system disclosed herein.

In one embodiment, upon the triggering of the bonus event, the central controller also determines which of the gaming devices in the gaming system shall also be provided with a chance to participate in the bonus event as indicted in block 104. In one embodiment, the central controller determines the status of the gaming devices in the gaming system and provides zero, one or more gaming devices which are in active status a chance to participate in the bonus event. In this embodiment such determination is based, at least in part, on the status of each of the gaming devices in the gaming system. In one embodiment, the status of one or more gaming machines in the gaming system as either enrolled or inactive status or active status determines whether those gaming machines are eligible to participate in the bonus event. In one embodiment, the status of one or more gaming machines in the gaming system when the bonus event is triggered also determines the number of bonus event awards provided in the bonus event. For example, the central controller determines that, based on one or more criteria as described below, auxiliary gaming machine 14*b* is in active status (and thus provided a chance to participate in the bonus event), auxiliary gaming machine 14*c* is in active status (and thus provided a chance to participate in the bonus event) and auxiliary gaming machine 14*z* is in inactive status.

The enrolled or inactive status means that the gaming machine is one of the linked gaming machines in the system, but is not being actively played by a player during a bonus event qualification period. A gaming machine may be classified as enrolled status for several reasons. For example, no player may be playing the gaming machine. In another example, a player could be playing the gaming machine (i.e., by having credits on the gaming machine), but be playing too slowly or be interrupted during play. In this case, the player could have credits on the credit meter of the gaming machine, but the player has not made a wager on a primary game or otherwise qualified for a bonus event during the bonus event qualification period.

The active status means that the gaming machine is being actively played by a player during a bonus event qualification period. In one embodiment, actively playing during a bonus event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the triggering of the bonus event. In this example, the bonus event qualification period is that fifteen second period prior to the triggering of the bonus event.

In another embodiment, the active status is alternatively or additionally based on the amount wagered on the plays of the primary game during a bonus event qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one player of a game, a plurality of plays of a game or all plays of a game in a designed period of time, such as a designed time period. It should be appreciated that a gaming machine is classified as active based on any one or more suitable parameters or criteria as determined by the implementer or operator of the gaming system.

Additionally, it should be appreciated that the gaming system disclosed herein contemplates other or additional methods for determining that a gaming machine is active. For instance, the player may be enabled to make a side wager or additional wager to be active for one or more subsequent bonus events. The side wager feature could also be time based where the additional wager causes the gaming machine to be active for a subsequent time period, such as one minute. In another alternative embodiment, a minimum wager level is required for a gaming machine to qualify to participate in the bonus event. In one embodiment, this minimum wager level is the maximum wager level for the primary game in the gaming machine. This requirement is in addition to the requirement that the gaming machine be active to qualify to participate in the bonus event participation gaming sequence. Another method for determining if the gaming machine is active is whether or not the player has wagered a minimum level of monetary units since the occurrence of the last bonus event.

It should also be appreciated that one or more additional statuses may be employed. For instance, a gaming machine will be in a participating status if an individual player playing the gaming machine is a premier player. This could be determined at least in part based on the status of that player determined via a player tracking card or other player identification device used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

In one embodiment, the triggering gaming device participates in the bonus event regardless of the status of such gaming device. In another embodiment, the triggering gaming device must be in a current state of active status to participate in the bonus event. In another embodiment, the gaming system requires that a designated number of auxiliary gaming devices are in active status. In another embodiment, each auxiliary gaming device is automatically provided a chance to participate in the bonus event. In another embodiment, a designated number of auxiliary gaming devices are each automatically provided a chance to participate in the bonus event. It should be appreciated that any suitable manner of determining which auxiliary gaming devices are provided a chance to participate in the bonus event may be implemented.

After determining which gaming devices will be provided a chance to participate in the bonus event, one, more and preferably each of such gaming devices participate in or initiate a separate bonus event participation sequence or sub-game to determine which gaming devices will actually participate in the bonus event as indicated by block 106 of FIG. 4. In this embodiment, one or more gaming devices selected to provide a chance to participate in the bonus event (along with the triggering gaming device) initiate or display a common bonus event participation gaming sequence or interface, such as the selection sub-game described below. In another embodiment, a plurality of the gaming devices selected to provide a chance to participate in the bonus event (with or without the triggering gaming device) each initiate or display a different bonus event participation gaming sequence or interface. In one embodiment, each player's odds of success in the bonus event participation gaming sequence is varied based on one or more suitable factors. It should be appreciated that since the triggering gaming device is guaranteed entry into the bonus event, the odds of success for this triggering gaming device in the bonus event participation gaming sequence is 100%. That is, regardless of anything the player of the triggering gaming device may do during the bonus event participation gaming sequence, the player of such triggering gaming device is insured of entrance into the bonus event.

In one embodiment, the odds of success for one or more gaming devices in the bonus event participation gaming sequence (i.e., and thus the odds of actually gaining entry to participate in the bonus event) are based on the accumulated bonus event pool of that gaming device. That is, the greater the accumulated wagers in a gaming device's associated accumulated bonus event pool, the greater the odds of success in the bonus event participation gaming sequence for that gaming device. For example, if the odds of participating in the bonus event is associated with a gaming device's maintained accumulated bonus event pool relative to a set or designated amount of accumulated wagers, such as two-hundred, when the bonus event is triggered and active auxiliary gaming device 14*c* maintains an accumulated bonus event pool of one-hundred, active auxiliary gaming device 14*c* will be associated with a 50% chance of success (100/200) in the bonus event participation gaming sequence.

In one embodiment, a plurality of gaming devices have different odds of success in the bonus event participation gaming sequence. In another embodiment, each of the gaming device have different odds of success in the bonus event participation gaming sequence. In another embodiment, a plurality of the gaming devices have the same odds of success in the bonus event participation gaming sequence. In another embodiment, each of the gaming devices have the same odds of success in the bonus event participation gaming sequence. In different embodiments, the odds of success for one or more gaming devices in the bonus event participation gaming sequence are predetermined, randomly determined, determined based on the player's wager, determined based on the player's status (such as determined through a player tracking system), determined based on a level of a jackpot award, determined based on time or determined based on any other suitable method.

Figure 5A:
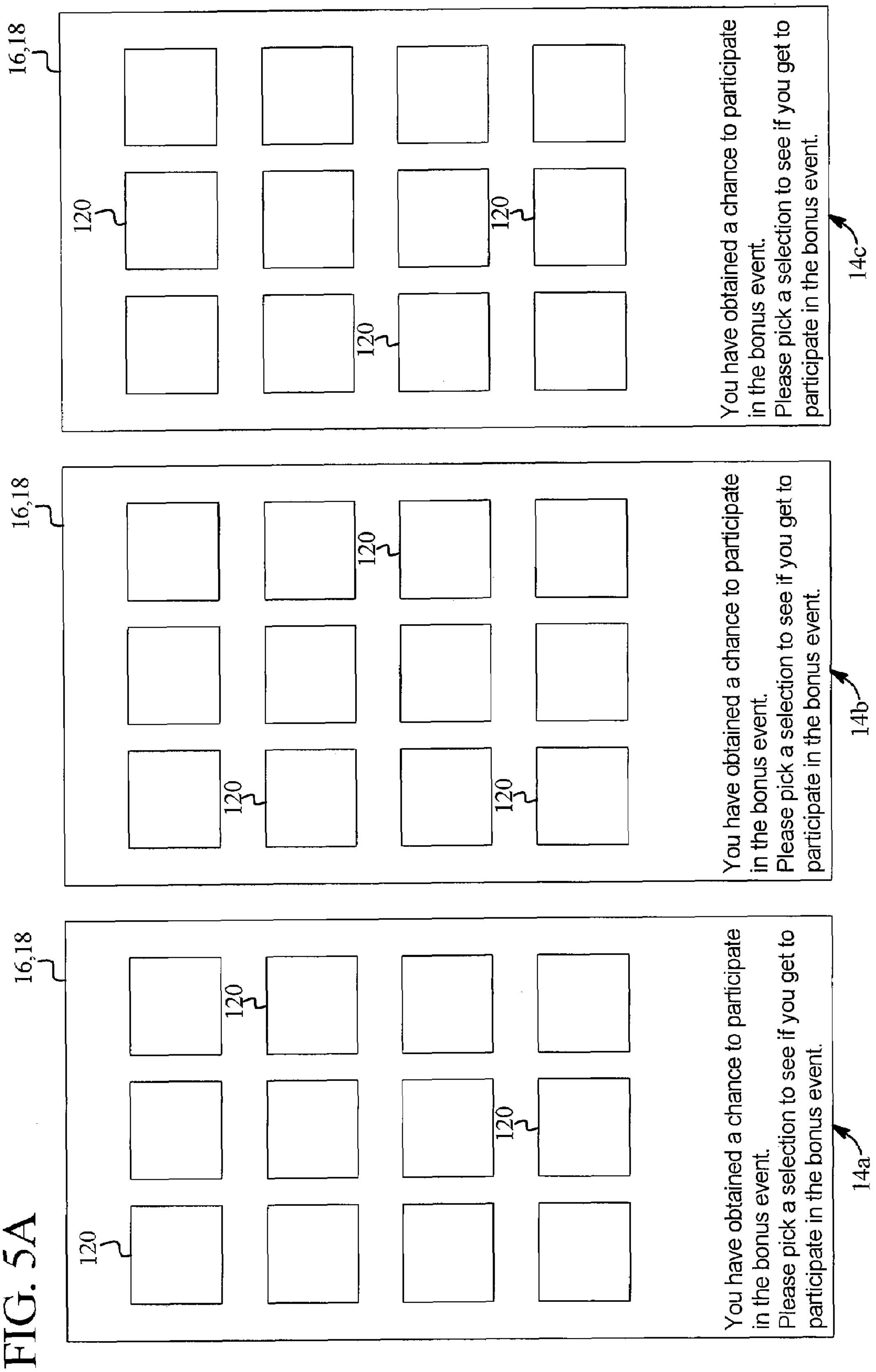
FIGS. 5A, 5B and 5C are top plan views of one embodiment disclosed herein illustrating one bonus event participation gaming sequence provided to a number of gaming devices in the gaming system.
Figure 5B:
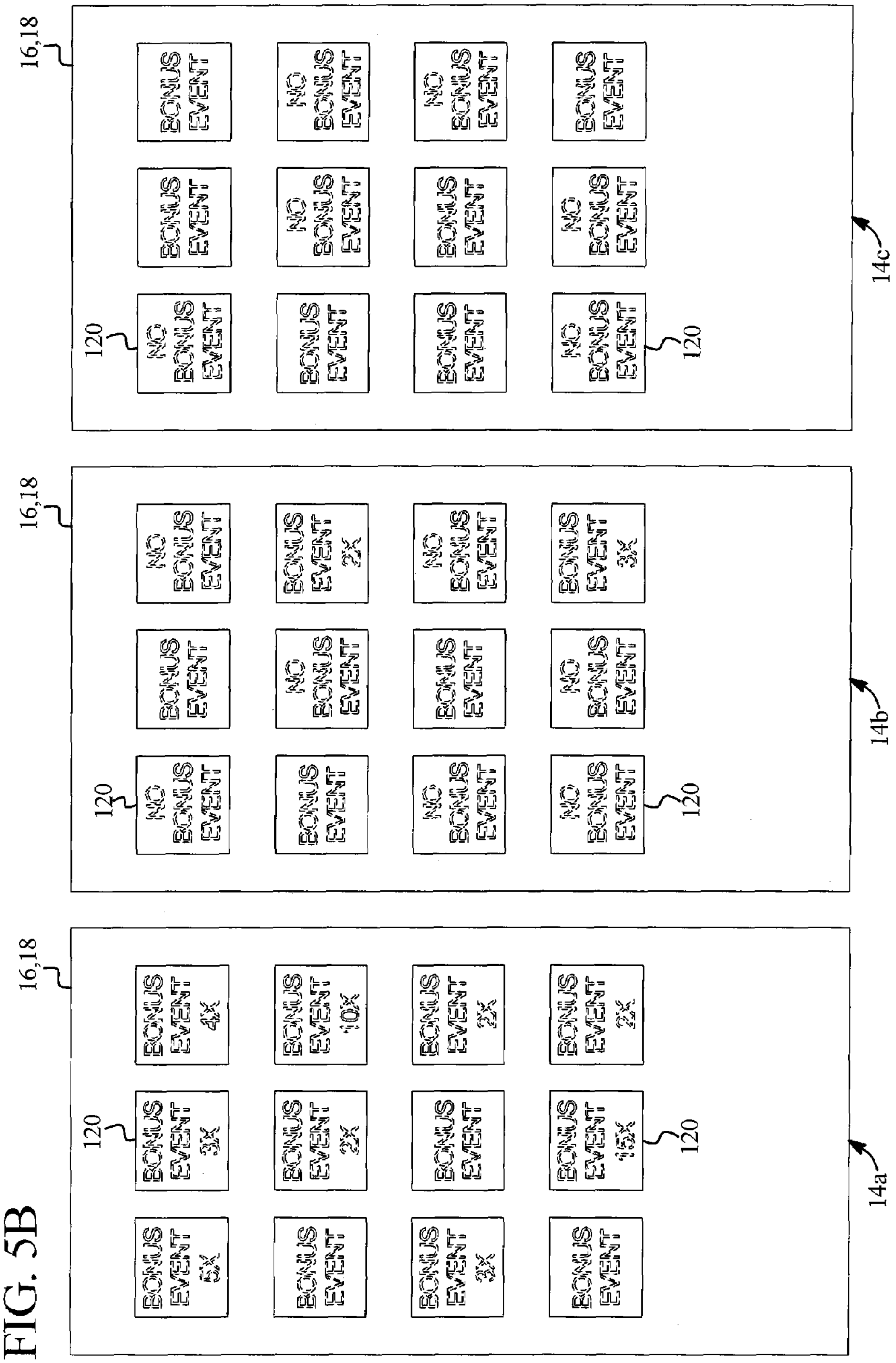
Figure 5C:
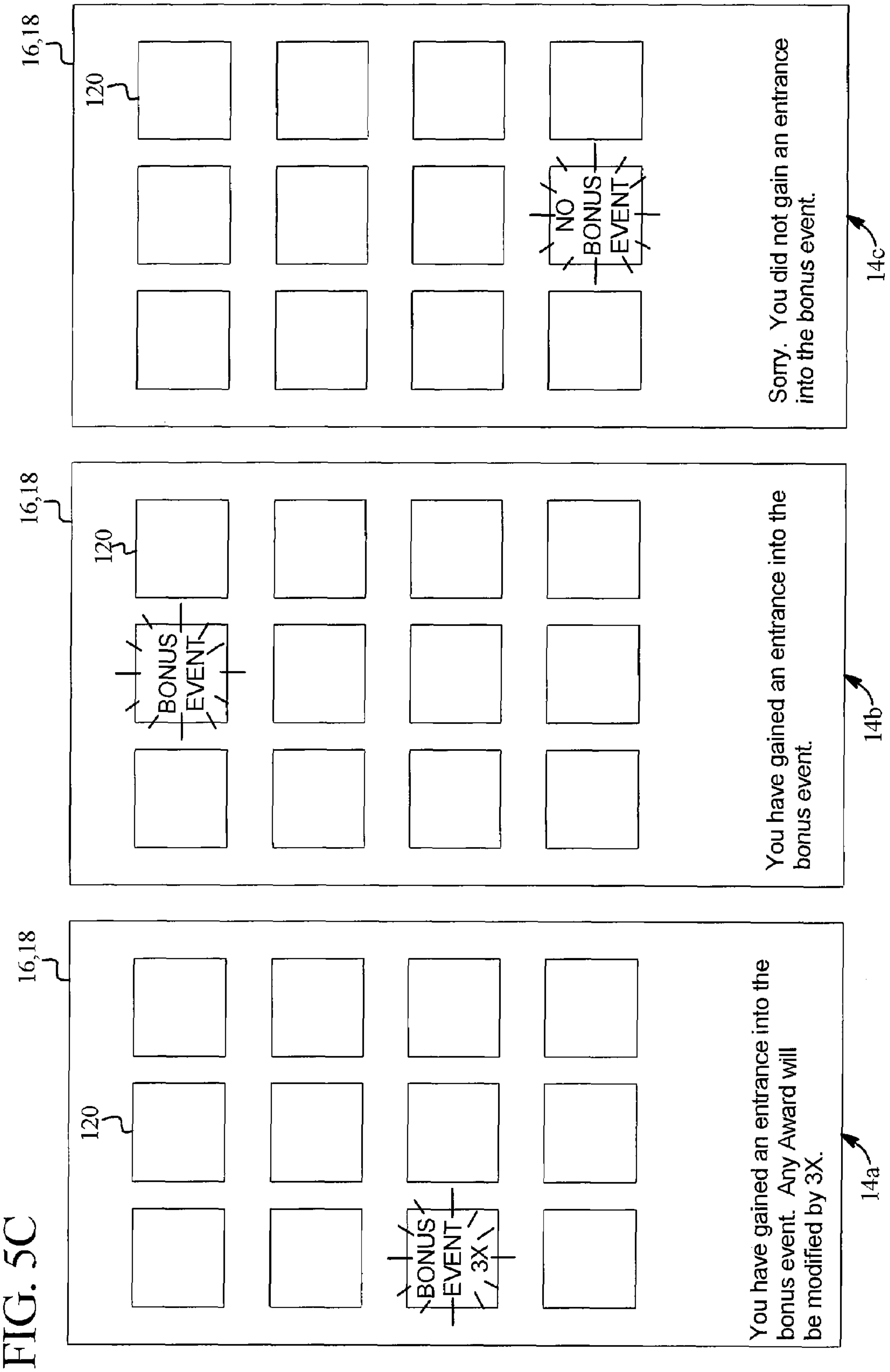

In one embodiment, as illustrated in FIGS. 5A to 5C, the bonus event participation gaming sequence or sub-game includes displaying a plurality of selections to one or more gaming devices which are provided a chance to participate in the bonus event. In this case, as illustrated in FIG. 5A, since auxiliary gaming devices 14*b* and 14*c* qualify for a chance to participate in the bonus event (and gaming device 14*a* is the triggering gaming device which automatically qualifies for a chance to participate in the bonus event), auxiliary gaming devices 14*b* and 14*c* and triggering gaming device 14*a* each display a plurality of selections 120. Each selection is associated with an entry into the bonus event, an entry into the bonus event with an associated modifier or a non-entry into the bonus event. In this embodiment, the odds of each selection being associated with an entry into the bonus event (with or without the associated modifier) is based on the accumulated bonus event pool of that gaming device. Appropriate messages such as "YOU HAVE OBTAINED A CHANCE TO PARTICIPATE IN THE BONUS EVENT" and "PLEASE PICK A SELECTION TO SEE IF YOU GET TO PARTICIPATE IN THE BONUS EVENT" may be provided to the player visually, or through suitable audio or audiovisual displays.

For example, since auxiliary gaming device 14*b* is associated with a 42% chance of success (i.e., an accumulated bonus event pool of 83/200), 42% of the selections displayed by auxiliary gaming device 14*b* (i.e., five of the twelve selections) will be associated with an entry into the bonus event (with or without the associated modifier) and 58% of the selections displayed by auxiliary gaming device 14*b* (i.e., seven of the twelve selections) will be associated with non-entries into the bonus event. In this example, since auxiliary gaming device 14*c* is associated with a 50% chance of success, 50% of the selections displayed by auxiliary gaming device 14*c* (i.e., six of the twelve selections) will be associated with an entry into the bonus event (with or without the associated modifier) and 50% of the selections displayed by auxiliary gaming device 14*c* (i.e., six of the twelve selections) will be associated with non-entries into the bonus event. It should be appreciated that since the triggering gaming device 14*a* is guaranteed entry into the bonus event, each of the plurality of selections displayed by triggering gaming device 14*a* are associated either with an entry into the bonus event or with an entry into the bonus event and an associated modifier. That is, regardless of which selection is picked at the triggering gaming device 14*a*, the player of such triggering gaming device is insured of entrance into the bonus event. FIG. 5B shows the different outcomes associated with each selection. It should be appreciated that these outcomes are shown in phantom for illustration purposes because such outcomes are not actually initially displayed to the player.

In different embodiments, the modifiers, if any, associated with the selections are predetermined, randomly determined, determined based on the player's wager, determined based on the player's status (such as determined through a player tracking system), determined based on a level of a jackpot award, determined based on time or determined based on any other suitable method. In another embodiment, the modifiers, if any, associated with the selections are selected from a range of values or modifiers. In another embodiment, a probability is associated with each modifier and each modifier is associated with a selection based on it's associated probability. In another embodiment, the modifiers associated with the selections for each gaming device are based on the bonus event accumulated wager pool for that gaming device relative to an average expected bonus event payout award determined for that gaming device.

In another embodiment (not shown), the player's chances of gaining entry into the bonus event is based on the accumulated bonus event pool and an average expected payout of a bonus event award. In this embodiment, if the average payout in the bonus event is one-hundred, an active gaming device with twenty credits accumulated in its associated accumulated bonus event pool is provided a one-in-five chance of qualifying to participate in the bonus event. In this example, if the active gaming device displays ten selections to the player of such gaming device, two selections will be associated with an entry into the bonus event (with or without the associated modifier) and either selections will be associated with non-entries into the bonus event. It should be appreciated that in this example, since the player's chances of gaining entry into the bonus event is based on the accumulated bonus event pool and an average expected payout of a bonus event award either (1) two selections may be associated with an entry into the bonus event (without associated modifiers) or (2) one selection may be associated with an entry into the bonus event (with an associated modifier of 2×) result in the same average expected payout of the bonus event award.

As illustrated in FIG. 5C, after displaying a plurality of selections at one or more active gaming machine, the players at such active gaming machines (including the triggering gaming device 14*a*) are enabled the pick one of the displayed selections. The entry (with or without the associated modifier) or non-entry into the bonus event associated with the picked selection is revealed. In this case, the player at gaming device 14*a* picked a selection associated with an entry (and an associated modifier of 3×), the player at gaming device 14*b* picked a selection association with an entry (without an associated modifier) and the player at gaming device 14*c* picked a selection associated with a non-entry. Appropriate messages such as "YOU HAVE GAINED AN ENTRANCE INTO THE BONUS EVENT" or "SORRY, YOU DID NOT GAIN AN ENTRANCE INTO THE BONUS EVENT" may be provided to the player visually, or through suitable audio or audiovisual displays.

In this embodiment, if a non-entry is revealed, that auxiliary gaming device will not participate in the bonus event. If an entry in the bonus event without an associated modifier is revealed, that auxiliary gaming device will participate in the bonus event and any bonus event award determined during the bonus event will be provided to the player. If an entry in the bonus event with an associated modifier is revealed, that auxiliary gaming device will participate in the bonus event and any bonus event award determined during the bonus event will be modified by the associated modifier and such modified bonus event award will be provided to the player.

After determining which gaming devices will participate in the bonus event, the central controller will initiate the bonus event for each gaming device determined to participate in the bonus event as indicated in block 108 of FIG. 4. In this case, triggering gaming device 14*a* and auxiliary gaming device 14*b* will each provide the initiated bonus event. In one embodiment, a bonus event award, such as a bonus event value, is determined for each gaming device participating in the bonus event as indicated in block 110. For example, a bonus event award of one-hundred is determined for triggering gaming device 14*a* and a bonus event award of two-hundred is determined for auxiliary gaming device 14*b*.

In one embodiment, each individual gaming device plays the bonus event and determines or generates a bonus event award independent of the central controller and any of the other gaming devices. In another embodiment, the bonus event utilizes a shared device or shared multi-outcome symbol display, such as a wheel positioned adjacent to each of a plurality of adjacently arranged gaming devices, to determine the bonus events awards for each gaming device participating in the bonus event. In one such embodiment, the shared display has a plurality of individual sections and symbols which represent the individual outcomes in the form of bonus event awards displayed at each section. In one such embodiment, the gaming devices of the gaming system are positioned and spaced apart substantially equally about the perimeter of the shared display, wherein the individual outcome or bonus event awards are fixed relative to each other. For example, the wheel may include the following bonus event award values displayed on the slices:

| Slice | Award Value |
|---|---|
| 1 | 50 |
| 2 | 150 |
| 3 | 75 |
| 4 | 125 |
| 5 | 100 |
| 6 | 100 |
| 7 | 5 |
| 8 | 195 |
| 9 | 25 |
| 10 | 175 |

In this example, assuming each slice is equally weighted (i.e., each has an equal probability of being selected), the average expected bonus event award value for the bonus event is the sum of the awards (1000) divided by the total number of awards (10) resulting in an average expected bonus event award value of 100.

In one embodiment, upon the initiation of the bonus event, gaming device system activates the shared display (i.e., causes a wheel to spin) and simultaneously generates a separate or individual outcome (i.e., a bonus event award) associated with each of the gaming devices determined to participate in the bonus event. In one embodiment, the separate outcomes are simultaneously generated or displayed to each player of each gaming device determined to participate in the bonus event. In this embodiment, each gaming device that participates in the bonus event is provided the individual outcome associated with that gaming device. Each gaming device that does not participate in the bonus event is not provided the outcome associated with that gaming device.

In one embodiment, the bonus event award determined for each gaming device participating in the bonus event is based, at least in part, on the accumulated bonus event pool for that gaming device. In one such embodiment, each gaming device's accumulated bonus event pool is equal to that gaming device's average expected bonus event award.

In one example of this embodiment, the gaming system includes five players with the following associated accumulated bonus event pools:

| Player | Pool |
|---|---|
| A | 90 |
| B | 150 |
| C | 20 |
| D | 100 |
| E | 275 |

In this example, upon a player triggering the bonus, each of the remaining players receive a bonus selection screen wherein the average expected bonus event award closely matches the value of the player's accumulated bonus event pool. If the bonus selection screen includes ten selections, the results masked by the selections are tailored specifically for each player so it matches their accumulated bonus event pool.

For example, if Player D triggered the bonus, Player D is automatically entered into the bonus event. In this example, each of the remaining players are provided a bonus event participation gaming sequence to determine whether or not they too will enter the bonus. An example screen for Player A would be as follows (in the actual game embodiment, the values at each selection would be masked or hidden from the player but are shown here for ease of illustration):

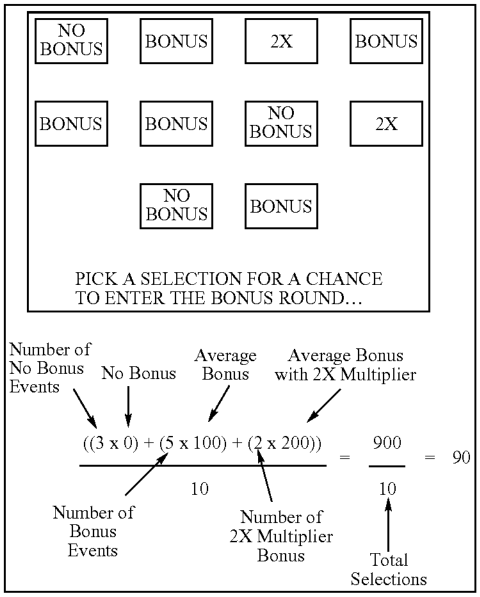

As illustrated, based on which outcomes are associated with which selections, Player A's average expected bonus event award of ninety is equal to Player A's accumulated bonus event pool of ninety. This average expected bonus event award was calculated based upon the above determined average expected bonus event award value of 100 and zero, one or more modifiers which are associated with zero, one or more of the selections. This embodiment takes into account which modifiers, if any, to associate with which selections. It should be further appreciated that in this example, since seven of the selections are associated with entries into the bonus event (with or without modifiers), Player A has a 70% chance of gaining entrance into the bonus event.

This bonus event participating gaming sequence is generated for each of the non-triggering players and the selections are such that each player's average expected bonus event award is equated as close as possible to each player's individual accumulated bonus event pool. For example, based on Player B's accumulated bonus event pool, the ten selections displayed for Player B are associated with one "No Bonus Event", five "Bonus Events", two "2× Bonus Events" and two "3× Bonus Events". In this example, based upon the average expected bonus event award value of 100, Player B's average expected bonus event award is 150 (or ((1×0)+(5×100)+(2×200)+(2×300))/10) which matches Player B's accumulated bonus event pool. Additionally, based on Player C's accumulated bonus event pool, the ten selections displayed for Player C are associated eight "No Bonus Event" and two "Bonus Events". In this example, based upon the average expected bonus event award value of 100, Player C's average expected bonus event award is 20 (or ((8×0)+(2×100))/10) which matches Player C's accumulated bonus event pool.

Moreover, based on Player E's accumulated bonus event pool, the ten selections displayed for Player E are associated with may be zero "No Bonus Events", two "Bonus Events", two "2× Bonus Events", four "3× Bonus Events", one "4× Bonus Event" and one "5× Bonus Event". In this example, based upon the average expected bonus event award value of 100, Player E's a average expected bonus event award is 270 or (((0×0)+(2×100)+(3×200)+(4×300)+(1×500))/10) which does not perfectly match Player E's accumulated bonus event pool of 275. This special case will be accounted for in the determination of a remainder to remain in Player E's accumulated bonus event pool as discussed in detail below.

It should be appreciated that because of the high value Player E's accumulated bonus event pool, Player E is guaranteed an entry into the bonus (i.e., zero "No Bonus Event" selections exist in their selection screen). On the other hand, each of the remaining players are guaranteed a chance to win an entry into the bonus event with the chance of entry into the bonus event directly related to their accumulated bonus event pools as shown above. This chance is a computation of the number of selections which grant entry into the bonus in relation to the total number of selections. For example, Player B has a 90% chance of entry (nine selections that grant entry in relation to ten selections overall) into the bonus event. It should be appreciated that this data could be displayed to the player in a form of a grid to encourage wagering or merely as an informative courtesy to the player to inform them of their chance of entering the bonus if it is triggered by another player.

Likewise, as indicated above, even though Player D is guaranteed entry into the bonus game because they are the triggering player (i.e., the gaming device Player D is playing is designated the triggering gaming device), Player D's bonus event participation gaming sequence is utilizes to determine a possible modifier or multiplier of any bonus event award Player D obtains in the bonus event.

In one embodiment, after the bonus event ends, the gaming device accumulated bonus event pool for each active gaming device that participated in the actual bonus event is decreased or reduced by a theoretical average expected bonus event award regardless of the actual bonus event award provided to the player. In this embodiment, upon the triggering of the bonus event, for each active gaming device, a theoretical average expected bonus event award is determined based on the accumulated bonus event pool of that gaming device and it is this theoretical average expected bonus event award (and not the actual bonus event award) which is subtracted from the accumulated bonus event pool.

In one such embodiment, before, during or after each of the players completing the bonus event participation gaming sequence, each player's the average expected bonus event award (used in the selection entry calculation defined above) is subtracted from each player's accumulated bonus event pool. In one embodiment, the player who triggered the bonus event (i.e., the player currently playing the gaming device designated as the triggering gaming device) does not have their accumulated bonus event pool reduced. In this embodiment, the player who triggered the bonus event received the trigger during the play of the primary game and thus the paytable of the primary game accounts for the bonus event award provided to this player. In the current example, each player's accumulated bonus event pools is reduced by that player's average expected bonus event award (determined above) to yield the following:

| Player | Pool |
|---|---|
| A | 0 |
| B | 0 |
| C | 0 |
| D | 100 |
| E | 5 |

As is shown above, Player E still has 5 monetary units remaining in their accumulated bonus event pool because of the remainder which occurred when their average expected bonus event award did not perfectly match Player E's accumulated bonus event pool. As further shown above, the accumulated bonus event pool for Player D is not reduced because Player D is designated as the triggering player and thus their bonus event is funded by a different pool (or alternatively by the paytable associated with a primary game they are playing).

Following the above described example, each eligible player qualifies to participate in the bonus event. For instance, Player C and triggering Player D both qualified without any associated modifier and Player E qualified with an associated modifier of 3×. Accordingly, Player C and Player E enter the bonus event along with Player D and all three actively participate in the bonus event (Players A and B failed to qualify during the bonus event participation gaming sequence and thus would not participate in the bonus event). It should be appreciated that since Player's A & B have a theoretical average expected bonus event award, the accumulated bonus event pool for Player's A and B is reset accordingly. In one example of a bonus event, Player C is provided an actual bonus event award of 175, Player E is provided an actual award of 25 and Player D is provided an actual award of 150. After applying the qualification multipliers, the resulting payouts would be 175 credits for Player C, (25×3) or 75 credits for Player E and 150 credits for Player D.

As shown above, the accumulated bonus event pool affects a player's chance of qualifying for a bonus event and a potential modifier, not the actual award they receive in the bonus event. In the above example, Player C had the lowest accumulated bonus event pool, but was provided the largest award while Player E had the largest accumulated bonus event pool and was provided the smallest award (of the players participating in the bonus event). Likewise, the triggering player is only guaranteed an award in the bonus event and is not assured of getting the largest award in the bonus event.

In the above example, the total award provided to the non-triggering players was 225 credits. As discussed above, each player's average expected bonus event award was subtracted from the wager pool to fund the bonus event for the non-triggering players. Thus, the total credits allocated for funding the bonus event in this example was 530 or (90+150+20+270). In one embodiment, any difference between the average expected bonus event awards allocated for funding the bonus for non-triggering players and the actual bonus event awards is allocated to a designated pool as a remainder. This remainder pool can be earmarked by the gaming system designer for any one or more of a number of uses, such as providing occasional bonuses to the players, funding one or more progressive awards, stored for backup use in case an actual bonus event award exceeds the average expected bonus event awards or be used in any other suitable manner.

In another embodiment, after each bonus event, the gaming device accumulated bonus event pool for each active gaming device that participate in the actual bonus event is reset to a designated amount, such as zero. In another embodiment, after each bonus event, the gaming device accumulated bonus event pool for each active gaming device which participated in the bonus event participation gaming sequence is reset to a designated amount, such as zero. In another embodiment, after each bonus event, the gaming device accumulated bonus event pool for one, more or each active gaming device is reset to a designated amount, such as zero. In another embodiment, after each bonus event, the gaming device accumulated bonus event pool for the triggering gaming device is reset to a designated amount, such as zero. In another embodiment, after each bonus event, the gaming device accumulated bonus event pool for the triggering gaming device is not reset to a designated amount. In this embodiment, since the bonus event award provided to the player of the triggering gaming device is not funded via the triggering gaming device's accumulated bonus event pool, but is alternatively funded, the triggering gaming device's accumulated bonus event pool need not be reset.

In another embodiment, an independent bonus event award is determined for each participating gaming device. In another embodiment, one, more or each bonus event awards is determined, at least in part, on one of the bonus event awards determined at at least one of the other participating gaming devices in the gaming system. In one such embodiment, the bonus event utilizes a shared device, such as a wheel to determine one, more or each bonus event awards. It should be appreciated that any suitable manner of determining a bonus event award may be implemented.

In one embodiment, the bonus event award provided at each gaming device is different. In another embodiment, the bonus event award provided at a plurality of gaming devices are different. In another embodiment, the bonus event award provided at each gaming device is the same. In another embodiment, the bonus event award provided at a plurality of gaming devices are the same.

After determining a bonus event award for each participating gaming device, any revealed modifiers are appropriately applied to any bonus event awards as indicated in block 112. That is, if a player picked selection revealed an associated modifier, the revealed modifier is applied to the bonus event award determined for such gaming device. In this case, since the player at triggering gaming device 14*a* picked a selection during the bonus event participation gaming sequence associated with a modifier of 3×, the bonus event award of one-hundred determined for triggering gaming device 14*a* is modified by the associated modifier of 3× to result in a modified bonus event award of three-hundred. Since the player at auxiliary gaming device 14*b* picked a selection during the bonus event participation gaming sequence not associated with a modifier, the bonus event award of two-hundred determined for auxiliary gaming device 14*b* is not modified. Each of the bonus event awards (whether modified or not) are provided to the respective players at the appropriate gaming devices and the bonus event ends as indicated in blocks 114 and 116, respectively.

In an alternative embodiment, the gaming system enables players at the gaming devices to place side bets which directly fund the accumulated bonus event pool of the player's respective gaming device. In this embodiment, as described above, the greater a gaming device's accumulated bonus event pool, the greater the chances of the player of the gaming device of qualifying for the bonus event and the greater the chances of the player of the gaming device obtaining a modifier during the bonus event participation gaming sequence. It should be appreciated that since the monetary units allocated to each accumulated bonus event pool are theoretically completely paid back to the player, the gaming system provides for the players to increase accumulated bonus event pools without otherwise affecting the payout percentages for the underlying primary or secondary games. In one embodiment, each placed side wager must be at least a designated amount to directly fund an accumulated bonus event pool.

Information Provided to Player

As indicated above, the bonus event awards can be completely mystery bonus awards provided to the players of the gaming machines with or without explanation or information provided to the player, or alternatively can be displayed to the player. In one embodiment, suitable information about the bonus event awards can be provided to the players through one or more displays on the gaming machines or additional information displays positioned near the gaming machines, such as above a bank of system gaming machines.

This information can be used to entertain the player or inform the player that a bonus event has occurred or will occur. Examples of such information are:

(1) that a bonus event has occurred;

(2) that a bonus event will shortly occur (i.e., foreshadowing the bonus event);

(3) that a gaming device qualifies to participate in the bonus event;

(4) that a gaming device has not qualified to participate in the bonus event;

(5) that one or more bonus event awards have been provided to one or more players of the system gaming machines;

(6) that one or more bonus event awards will be shortly provided to one or more players of the system gaming machines;

(7) that a player's accumulated bonus event pool is at or near a threshold amount level;

(8) the player's chances or odds of entering the bonus event participation gaming sequence;

(9) the player's chances or odds of a successful outcome in the bonus event participation gaming sequence

(10) the player's chances or odds of obtaining a modifier in the bonus event participation gaming sequence;

(11) the amount of the bonus event awards won; and

(12) the amount of the bonus event awards that can be won;

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming machines; and at least one controller configured to communicate with said gaming machines, wherein the at least one controller is programmed to:

(a) identify a plurality of players of said gaming machines;

(b) for each identified player, maintain an accumulated bonus event pool, wherein the accumulated bonus event pool maintained for the identified player is based on any wagers placed by the identified player on said gaming machines;

(c) determine if a bonus event will occur; and (d) if the bonus event is determined to occur, for said bonus event:

(i) designate one of the identified players as a triggering player, (ii) designate each of the remaining identified players as auxiliary players, and (iii) cause the gaming machine of the triggering player and the gaming machine of at least one of the auxiliary players to each provide a bonus event participation gaming sequence, wherein for each of said auxiliary players, a probability of success in the bonus event participation gaming sequence is based, at least in part, on the accumulated bonus event pool maintained for said auxiliary player, wherein different accumulated bonus event pools greater than zero have different probabilities of success.

2. The gaming system of claim 1, wherein the at least one controller is programmed to determine if each identified player is playing at least one of said gaming machines in an active state.

3. The gaming system of claim 2, wherein if the bonus event is determined to occur, the at least one controller is programmed to designate each of the remaining identified players in the active state as auxiliary players.

4. The gaming system of claim 1, wherein if the bonus event is determined to occur, the at least one controller is programmed to cause each of a plurality of the auxiliary players to provide the bonus event participation gaming sequence.

5. The gaming system of claim 1, wherein if the bonus event is determined to occur, the at least one controller is programmed to cause each of the auxiliary players to provide the bonus event participation gaming sequence.

6. The gaming system of claim 1, wherein the triggering player is associated with a one-hundred percent probability of success in the bonus event participation bonus sequence.

7. The gaming system of claim 1, wherein the determination that the bonus event will occur is independent of any displayed event in any play of any primary game or of any plays of any secondary game of the gaming machines.

8. The gaming system of claim 1, wherein said probabilities of success are each greater than zero percent and less than one-hundred percent.

9. The gaming system of claim 1, wherein said plurality of players are identified in association with a player tracking system.

10. A gaming system comprising:

a plurality of gaming machines; and at least one controller configured to communicate with said gaming machines, wherein the at least one controller is programmed to:

(a) identify a plurality of players of said gaming machines;

(b) for each identified player, maintain an accumulated bonus event pool, wherein the accumulated bonus event pool maintained for the identified player is based on any wagers placed by the identified player on said gaming machines;

(c) determine if a bonus event will occur; and (d) if the bonus event is determined to occur, for said bonus event:

(i) designate one of the gaming machines as a triggering gaming machine, (ii) designate each of the remaining gaming machines as auxiliary gaming machines, and (iii) cause the triggering gaming machine and at least one of the auxiliary gaming machines to each provide a bonus event participation gaming sequence, wherein for each of said auxiliary gaming machines, a probability of success in the bonus event participation gaming sequence is based, at least in part, on the accumulated bonus event pool maintained for said identified player of said auxiliary gaming machine, wherein different accumulated bonus event pools greater than zero have different probabilities of success.

11. The gaming system of claim 10, wherein the at least one controller is programmed to determine if each gaming machine is in an active state.

12. The gaming system of claim 11, wherein if the bonus event is determined to occur, the at least one controller is programmed to designate each of the remaining gaming machines in the active state as auxiliary gaming machines.

13. The gaming system of claim 10, wherein if the bonus event is determined to occur, the at least one controller is programmed to cause each of a plurality of the auxiliary gaming machines to provide the bonus event participation gaming sequence.

14. The gaming system of claim 10, wherein if the bonus event is determined to occur, the at least one controller is programmed to cause each of the auxiliary gaming machines to provide the bonus event participation gaming sequence.

15. The gaming system of claim 10, wherein the triggering gaming machine is associated with a one-hundred percent probability of success in the bonus event participation bonus sequence.

16. The gaming system of claim 10, wherein the determination that the bonus event will occur is based on at least one displayed event in the play of the primary game of the triggering gaming machine.

17. The gaming system of claim 10, wherein the triggering gaming machine is the gaming machine which triggered the bonus event.

18. The gaming system of claim 10, wherein the determination that the bonus event will occur is independent of any displayed event in any play of any primary game or of any plays of any secondary game of the gaming machines.

19. The gaming system of claim 10, wherein said probabilities of success are each greater than zero percent and less than one-hundred percent.

20. The gaming system of claim 10, wherein said plurality of players are identified in association with a player tracking system.

21. A method of operating a gaming system, said method comprising:

(a) identifying a plurality of players of a plurality of gaming machines;

(b) for each identified player, maintaining an accumulated bonus event pool, wherein the accumulated bonus event pool maintained for the identified player is based on any wagers placed by the identified player on said gaming machines;

(c) determining if a bonus event will occur; and (d) if the bonus event is determined to occur, for said bonus event:

(i) designating one of the identified players as a triggering player, (ii) designating each of the remaining identified players as auxiliary players, and (iii) causing the gaming machine of the triggering player and the gaming machine of at least one of the auxiliary players to each provide a bonus event participation gaming sequence, wherein for each of said auxiliary players, a probability of success in the bonus event participation gaming sequence is based, at least in part, on the accumulated bonus event pool maintained for said auxiliary player, wherein different accumulated bonus event pools greater than zero have different probabilities of success.

22. The method of claim 21, which includes determining if each identified player is playing at least one of said gaming machines in an active state.

23. The method of claim 22, which includes designating each of the remaining identified players in the active state as auxiliary players if the bonus event is determined to occur.

24. The method of claim 21, which includes causing each of a plurality of the auxiliary players to provide the bonus event participation gaming sequence if the bonus event is determined to occur.

25. The method of claim 21, which includes causing each of the auxiliary players to provide the bonus event participation gaming sequence if the bonus event is determined to occur.

26. The method of claim 21, wherein the triggering player is associated with a one-hundred percent probability of success in the bonus event participation bonus sequence.

27. The method of claim 21, wherein the determination that the bonus event will occur is independent of any displayed event in any play of any primary game or of any plays of any secondary game of the gaming machines.

28. The method of claim 21, wherein said probabilities of success are each greater than zero percent and less than one-hundred percent.

29. The method of claim 21, which includes identifying said plurality of players in association with a player tracking system.

30. The method of claim 21, which is provided via a data network.

31. The method of claim 30, wherein said data network is an internet.

32. A method of operating a gaming system, said method comprising:

(a) identifying a plurality of players of a plurality of gaming machines;

(b) for each identified player, maintaining an accumulated bonus event pool, wherein the accumulated bonus event pool maintained for the identified player is based on any wagers placed by the identified player on said gaming machines;

(c) determining if a bonus event will occur; and (d) if the bonus event is determined to occur, for said bonus event:

(i) designating one of the gaming machines as a triggering gaming machine, (ii) designating each of the remaining gaming machines as auxiliary gaming machines, and (iii) causing the triggering gaming machine and at least one of the auxiliary gaming machines to each provide a bonus event participation gaming sequence, wherein for each of said auxiliary gaming machines, a probability of success in the bonus event participation gaming sequence is based, at least in part, on the accumulated bonus event pool maintained for said identified player of said auxiliary gaming machine, wherein different accumulated bonus event pools greater than zero have different probabilities of success.

33. The method of claim 32, which includes determining if each gaming machine is in an active state.

34. The method of claim 33, which includes designating each of the remaining gaming machines in the active state as auxiliary gaming machines if the bonus event is determined to occur.

35. The method of claim 32, which includes causing each of a plurality of the auxiliary gaming machines to provide the bonus event participation gaming sequence if the bonus event is determined to occur.

36. The method of claim 32, which includes causing each of the auxiliary gaming machines to provide the bonus event participation gaming sequence if the bonus event is determined to occur.

37. The method of claim 32, wherein the triggering gaming machine is associated with a one-hundred percent probability of success in the bonus event participation bonus sequence.

38. The method of claim 32, wherein the determination that the bonus event will occur is based on at least one displayed event in the play of the primary game of the triggering gaming machine.

39. The method of claim 32, wherein the triggering gaming machine is the gaming machine which triggered the bonus event.

40. The method of claim 32, wherein the determination that the bonus event will occur is independent of any displayed event in any play of any primary game or of any plays of any secondary game of the gaming machines.

41. The method of claim 32, wherein said probabilities of success are each greater than zero percent and less than one-hundred percent.

42. The method of claim 32, which includes identifying said plurality of players in association with a player tracking system.

43. The method of claim 32, which is provided via a data network.

44. The method of claim 43, wherein said data network is an internet.

* * * * *